Feb. 12, 1957 G. H. LEONARD 2,781,172

ELECTRO-MECHANICAL COUNTER

Filed Feb. 27, 1953 6 Sheets-Sheet 1

INVENTOR
GEORGE H. LEONARD
BY John C. Dorfman
ATTORNEY

Feb. 12, 1957 G. H. LEONARD 2,781,172

ELECTRO-MECHANICAL COUNTER

Filed Feb. 27, 1953 6 Sheets-Sheet 2

INVENTOR
GEORGE H. LEONARD
BY John C. Dorfman
ATTORNEY

INVENTOR
GEORGE H. LEONARD
BY John C. Dorfman
ATTORNEY

INVENTOR
GEORGE H. LEONARD
BY John C. Dorfman
ATTORNEY

INVENTOR
GEORGE H. LEONARD
BY John C. Dorfman
ATTORNEY

INVENTOR
GEORGE H. LEONARD
BY John C. Dorfman
ATTORNEY

United States Patent Office
2,781,172
Patented Feb. 12, 1957

2,781,172

ELECTRO-MECHANICAL COUNTER

George H. Leonard, Darien, Conn.

Application February 27, 1953, Serial No. 339,269
24 Claims. (Cl. 235—132)

This invention concerns improved mechanical counters of the rotatable shaft variety. More specifically this invention concerns counters which are capable of counting at a high rate of speed. Readings may be taken from this novel counter in a highly accurate manner and, in some instances, said readings may be read remotely from the counter or stored for future reference. The various novel means of taking readings provided by this invention may be made to operate fully automatically or semi-automatically. In addition, one species of this invention is pre-settable to count to any given number within the capacity of the counter.

It is often desirable to count the movements of a device or the number of operations which said device performs. Because of their relative reliability, ruggedness and long life expectancy, mechanical counters are highly desirable for such purposes. However, for most high speed counting applications mechanical counters have been largely ruled out because their structural components are unable to withstand the high rates of speed involved.

Electronic counters have become common for applications involving high speed counting. Such electronic counters have a large capacity and an almost unlimited rate of storage which may be quickly and accurately read or which may be recorded or "remembered" by the counter. However, electronic counters tend to be rather bulky because of the number of tubes and components required for each operation of the counter. Even very simple counters with a relatively large capacity usually involve several chassis so that the equipment quickly becomes bulky. Furthermore, although electronic equipment has become much more reliable than it use to be, it is still much more subject to failure than relatively simpler mechanical equipment, and the repair of said electronic equipment often requires a great deal of time and effort on the part of a skilled tradesman.

The present invention concerns a mechanical counter which, like many other types of mechanical counters, is reliable, rugged, and has a long life expectancy. Said mechanical counter can be made to have an almost unlimited storage capacity. It is able to operate under circumstances requiring substraction as well as addition to the count. It is able to render an accurate count reading quickly. In addition, it has a higher rate of storage than prior mechanical counters, which high storage rate makes it useful in areas heretofore preempted by electronic counters. Its light weight and simple and compact structure occupies relatively little space compared to an electronic counter.

This novel counter is advantageously driven by the device whose movements are to be counted. For instance, the counter may be gear driven by coupling it to some rotating part of the device. When driven in one direction, the counter adds, and, when driven in the opposite direction, it substracts. The power input drive shaft may be mounted on frictionless bearings so that extremely high rotational speeds, in the order of 10,000 R. P. M. and higher, are permitted. Such a speed will permit the storage of 1,000,000 units per minute using the preferred form of the counter. The counter has stationary and rotational members between which no permanent contact, other than at the bearings, need be made. And, if such contact is made at other points, it may be of such a nature as neither to impair the potential speed of the counter nor to prevent the reversing of the counter.

A shaft rotatably mounted on a reference frame provides a simple counter. As it rotates, various points on the shaft or its calibration means appear opposite any given point on the stationary frame. If the shaft is always viewed from the same position on the frame, the shaft, or calibration means mounted on the shaft to rotate with the shaft, may be calibrated so that successive portions of the shaft passing this viewing position represent consecutive numbers. Since the counter is intended to be linear in its operation, whatever means of calibration is employed, the calibrations should be spaced at equal angles of rotation from one another. In order to minimize confusion in reading the calibrations and to limit the amount of the calibration means which can be read, a viewer mechanism is advantageously mounted on the frame in proper position to cooperate with the calibration means on the shaft.

There is a practical limit to the number of units which may be counted by a single shaft, which limit is determined by the number of calibrations which may be conveniently read using a given mechanism in cooperation with a given calibration means. If greater capacity is required of a counter for a particular application, more than one rotatable counting shaft may be employed. When a plurality of shafts are employed, they may be coupled together, as by gears, to rotate at speeds in a particular ratio. The slower shafts then become storage shafts inasmuch as a part of a revolution of a slower shaft records a full revolution of a faster shaft. Thus, if the faster counting shaft rotates "$r$" times faster than the slower shaft, the slower shaft is able to record "$r$" full revolutions of the faster shaft and moves only $1/r$ revolution in a full revolution of the faster shaft. It is therefore possible to calibrate the slower shaft every $1/r$ revolution to represent number of revolutions from zero to "$r$" made by the faster shaft. Successively slower counting shafts may be made to record the number of revolutions made by the next faster counting shaft in a similar manner.

If a single counting shaft or the fastest counting shaft in a multi-shaft counter is to count "$n$" consecutive numbers in one revolution, the centers of adjacent calibrations will be separated $1/n$ revolution or $360/n$ degrees of rotation from one another. It will be appreciated that, "$n$" corresponds to "$r$" as previously defined where the two shafts, the speed ratios of which is $r$:1, are a shaft of the device or one appended to the device the speed of which is to be measured and the fastest counting shaft. However, "$n$" may be arbitrarily selected for the counter, leaving the mechanic to choose the proper coupling for interconnecting the device and the counter.

Difficulty in reading the calibrations on the counting shafts will be experienced if the viewer mechanisms are mounted in fixed position relative to the frame. If a particular shaft stops so that the center of a calibration is squarely opposite the viewer mechanism, there is no difficulty in "reading" the count. Should the calibration means be stopped so that a portion between calibrations is opposite the viewer mechanism, difficulty will be experienced in obtaining an accurate reading.

According to the present invention this difficulty in obtaining an accurate reading is eliminated. With respect to the fastest counting shaft, the difficulty may be resolved in one of two ways. The first method of resolving the problem is to permit the shaft to stop and record in only "$n$" discrete positions corresponding to the positions where the "$n$" calibrations of said shaft are squarely opposite the viewer mechanism. The second method is to permit the viewer mechanism to be moved into such position for reading the count that the proper calibration on the calibration means is squarely in the view of the viewer mechanism. In order for a reading to be made using this second method, an adjustment of the position of the viewer mechanism relative to the frame must be made. In order to be able to adjust to the proper position, the viewer mechanism must be able to move sufficiently far to be positioned squarely opposite a given calibration in any of its possible positions over $1/n$ revolution. This adjustment may be accomplished by the use of coupling linkage to a cam follower which, when the rotation is stopped, is moved into contact with a cam. This cam is preferably mounted on a shaft, such as an input drive shaft. However, a cam may even be mounted on the very shaft under observation, to some advantage. In any event, the cam must be of such shape that, when the cam follower contacts the cam surface, the viewer mechanism will be caused to occupy a position squarely opposite the proper calibration on the calibration means. The cam must be oriented on its shaft so that the viewer mechanism will always read the proper number over the full $1/n$ revolution of the viewed counting shaft assigned to that number and so that, at the proper point, change-over from one number to the next will take place.

According to the present invention, slower counting shafts are all equipped with viewer mechanisms which are movable relative to the frame at least an amount corresponding to that part of a revolution represented by the distance between the centers of adjacent calibrations. These viewer mechanisms are each, in turn, connected through a linkage system to a cam follower. The cam follower for the viewer mechanism which cooperates with the calibration means on any given counting shaft is designed to cooperate with a cam, preferably on the next faster counting shaft, in the manner previously described. Each cam is properly oriented relative to the calibration means with which the viewer mechanism affected by it cooperates to cause said viewer mechanism to move to a position squarely opposite the proper calibration on said calibration means when its cam follower is brought into reading position against said cam. The cams must all also be properly oriented relative to the calibration means on its same counting shaft so that at "in unison" reading change-overs all affected viewer mechanisms will be moved to cause all of said changes in readings of the affected calibration means at the proper time. Thus it is that all the cams and all the calibration means of the counter must be properly oriented relative to one another in order to insure accurate functioning of the counter.

A high degree of accuracy in readings is obtained by referring the viewer mechanism back to a faster counting shaft than the one which mounts the calibration means with which said mechanism cooperates. The cam surface may thus be made longer in proportion to the ratio of speeds of the shafts mounting the calibration means, respectively, than it could be if both cam and calibration means were mounted on the same shaft. Accordingly, a cam mounted on the faster shaft is more accurate by the ratio of speeds involved, assuming the same degree of precision is applied to the manufacture of the cams for both possible uses.

As the fastest counting shaft turns, every other counting shaft of the counter turns at a speed proportionally slower than the fastest counting shaft depending on the coupling ratio between the two shafts. Consequently relatively slow shafts tend to move an angle approaching the order of magnitude of error when the fastest shaft moves but one unit. Accordingly inaccurate readings may result, particularly at or near "in unison" change-over points, i. e., the points at which cam discontinuities oppose the cam follower. Accuracy is preserved in the present invention by the use of a "double jointed" mounting for the cam followers in those positions beyond that follower which cooperates with the fastest shaft ( i. e., those cooperating with slower shafts). This double jointed cam follower permits the conventional movement which brings the follower against the cam surface. In addition, it permits movement of the follower in such a direction that it remains squarely opposite a given point on a cam for a distance determined by the distance between discontinuities of the next faster cam. In other words, this second movement is essentially like that imposed upon the viewer mechanisms to make them follow or move along with a given calibration rather than a given point on a cam; hence, the number of points followed on the cam will be the number of calibrations on the previous shaft. Thus, if a discontinuity is to be passed in changing one unit, a discontinuity must also be passed on the previous faster cam so that in moving from opposite one discrete point on the cam to the next, the discontinuity will be passed and the appropriate change in reading of the calibrations on the relatively slow shaft will take place.

Ease in zero setting adds materially to the practical value of a counter. The present invention may be easily zero set because it lends itself to a variety of methods of realignment of all of the calibration means and all of the cams relative to one another and relative to the frame. Zero setting is merely a process of aligning all of the calibration means and cams into a unique relationship with one another and with the frame. To simplify zero setting, the cams may each be fixed relative to the calibration means on the same shaft. The calibration means may either be fixed to the counting shaft or else be able to be moved relative to the shaft. If fixed to the shaft, the shafts may be freed from their normal operating interconnection means in one way or another to rotate independently of one another so that they may each be fixed in proper zero position relative to the frame or so that they may be fixed relative to one another and then one or more of them fixed relative to the frame. If the shafts cannot be freed with respect to one another, calibration means may instead be freed from the shaft in order to be adjusted with respect to one another and the frame as previously described.

In some applications it is desirable to count to a certain pre-established number. A species of the present invention is able to do this. Such a counter involves two initial operations not necessary in the counters previously described, namely, preselection of the number and presetting of the counter so that it will count to said number and stop or signal. Pre-setting, which is akin to zero setting, involves adjustment of each of the calibration means to a position relative to the other calibration means, the cams and the frame, which position represents the number which has been pre-selected or the complement of said number. Pre-selection usually involves the use of a viewer mechanism which may be pre-arranged to hold the calibration means in its proper position, once said means arrives at said position, to represent the number pre-selected. If the zero position is used as the standard terminal position, the counter may be arranged to provide a signal of some sort whenever it reaches zero position. Thus, if the counter is pre-set to the pre-selected number, the counter need merely be run backwards to its zero position in order to count the desired number of units pre-selected. On the other hand, the same result may be accomplished by running the counter forward after presetting to the complement (the capacity of the counter minus the pre-selected number).

For a better understanding of the present invention reference is made to the following drawings.

Figure 1:
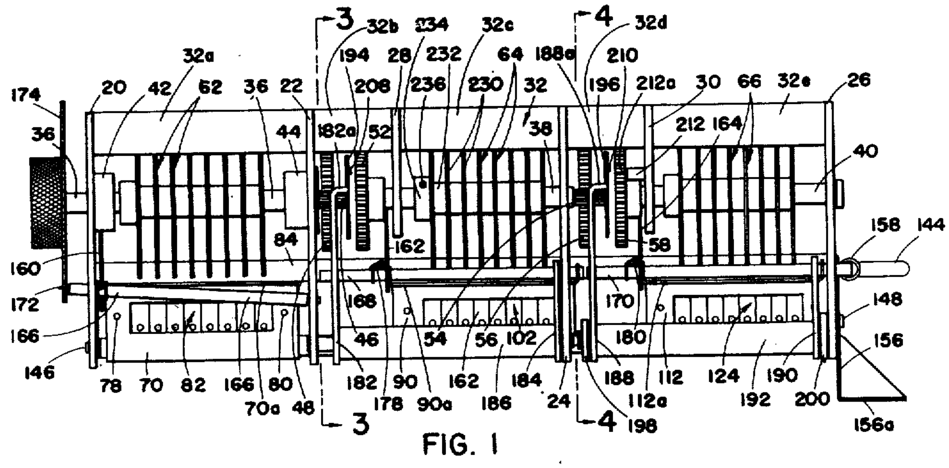
Fig. 1 is a plan view from above of a preferred version of the counter which employs three counting shafts.
Figure 3:
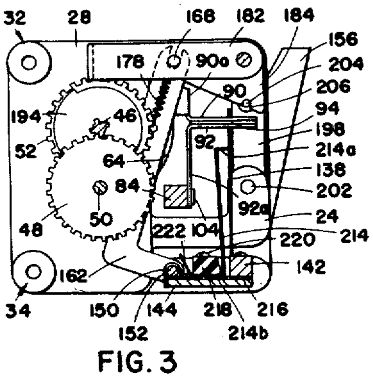

Fig. 3 is a cross-sectional view of the same counter taken along line 3—3 of Fig. 1.

Figure 4:
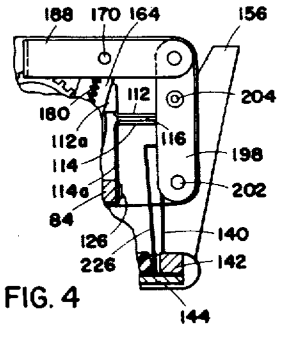

Fig. 4 is a fragmentary cross-sectional view of the same counter taken along line 4—4 of Fig. 1.

Figure 5:
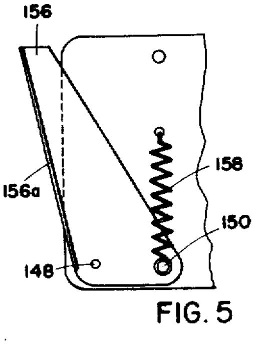

Fig. 5 is a fragmentary elevation of the same counter from one end.

Figure 6:
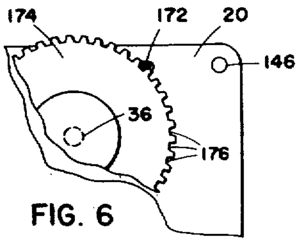

Fig. 6 is a fragmentary elevation of the same counter from the other end.

Figure 7A:
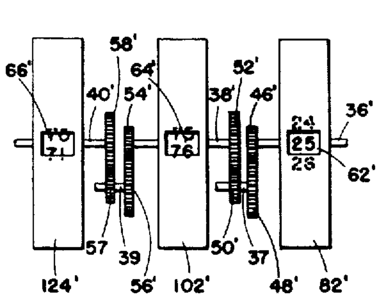

Fig. 7*a* is a schematic elevational view of a visual reading, speedometer type counter.

Figure 7B:
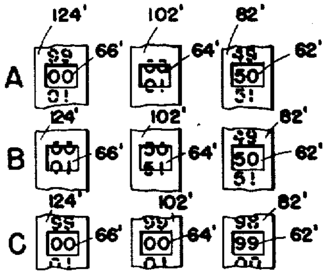
Figure 7C:
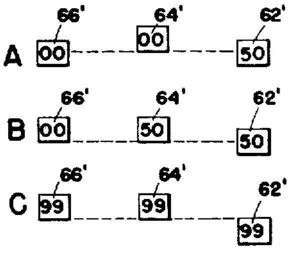

Figs. 7*b* and 7*c* show selected readings of the counter of Fig. 7*a* as they would appear respectively with and without the application of a feature of the present invention.

Figure 8:
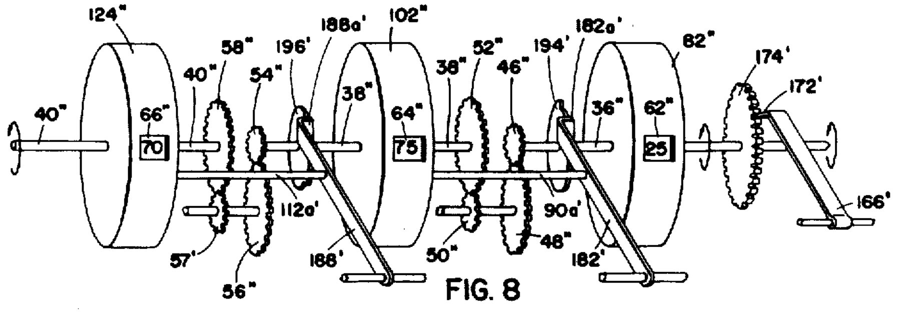

Fig. 8 illustrates schematically in perspective the application of features of the present invention to the structure of Fig. 7*a*.

Figure 9A:
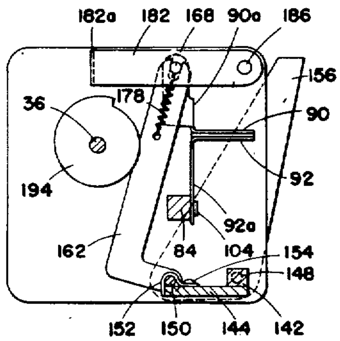
Figure 9B:
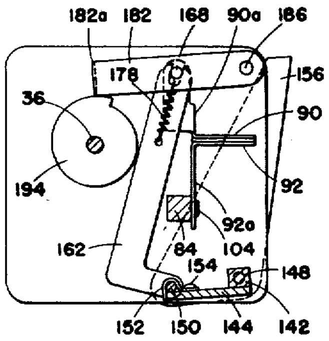
Figure 9C:
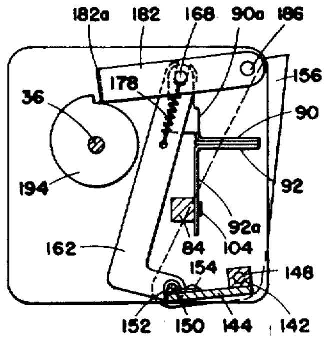

Figs. 9*a*, 9*b* and 9*c* show schematically the operation of the cam, cam follower and linkage connections to establish the proper position of a viewer mechanism in a structure of the Figs. 1–6 type.

Figure 10A:
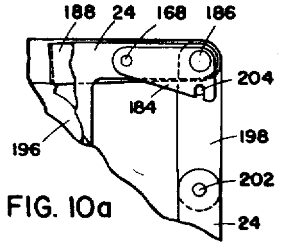
Figure 10B:
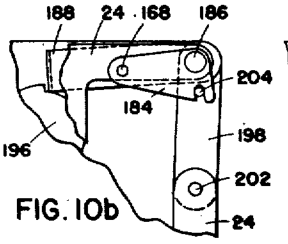

Figs. 10*a* and 10*b* illustrate schematically the action of a further refinement of the present invention as applied to the counter structure of Figs. 1–6.

Figure 11A:
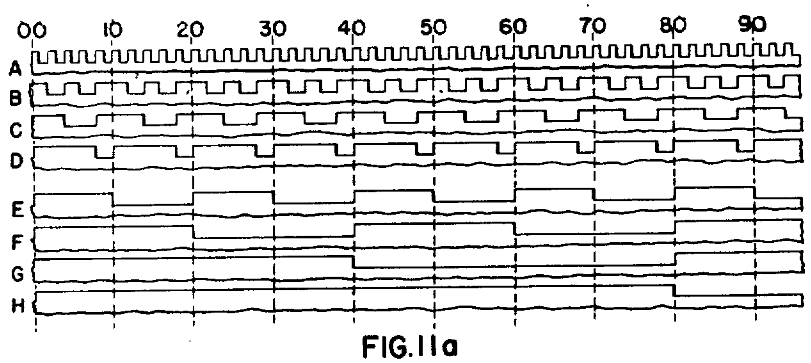
Figure 11B:
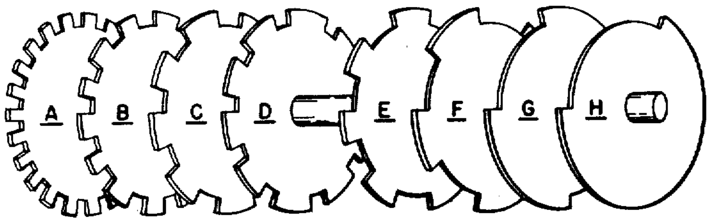

Figs. 11*a* and 11*b* illustrate schematically the relationships of the disk members of calibration means of the type employed in the Fig. 1–6 counter construction.

Figure 12A:
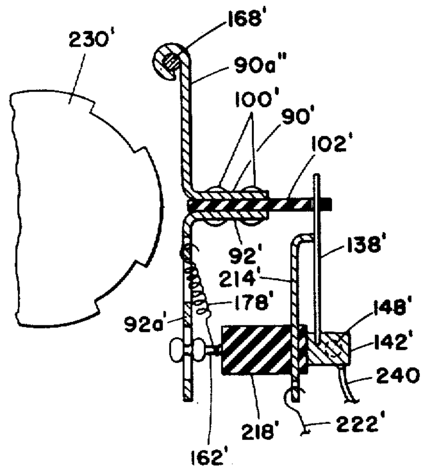
Figure 12B:
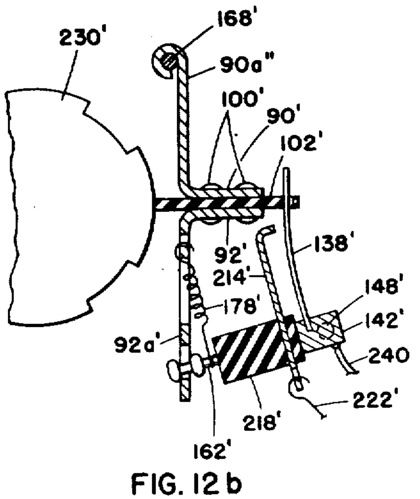

Figs. 12*a* and 12*b* show in detail the action of one switch type viewer mechanism employing sensing fingers in combination with calibration means of the type illustrated in Fig. 11*b*.

Figure 13:
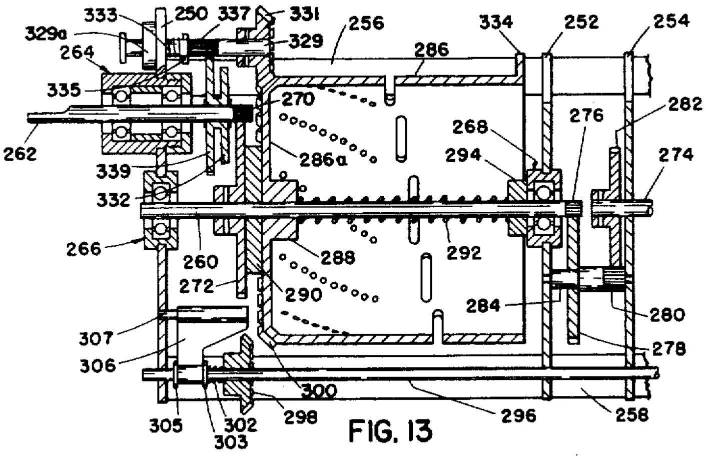

Fig. 13 illustrates the fastest counting shaft stage of a multi-shaft counter of the same general type as the counter of Figs. 1–6 with certain major modifications.

Figure 13A:
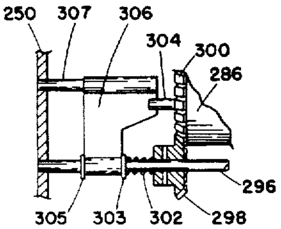

Fig. 13*a* is an inset view of a zero setting stop means which may be employed with the structure of Fig. 13 in operating position.

Figure 14:
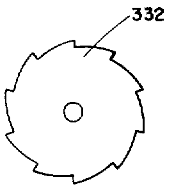

Fig. 14 is a plan view of a cam member which is employed in the structure of Fig. 13.

Figure 15:
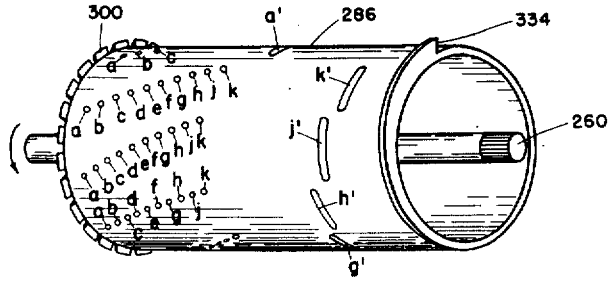

Fig. 15 illustrates in perspective the drum type calibration means employed in the Fig. 13 type counter.

Figure 16A:
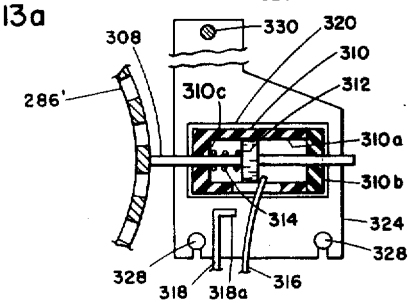
Figure 16B:
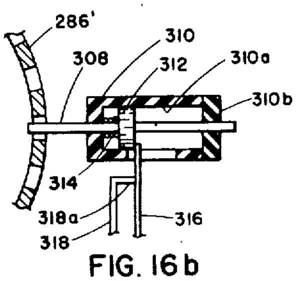

Figs. 16*a* and 16*b* illustrate a section through one cell of a modified type of viewer mechanism for use with the structure of Fig. 13.

Figure 17:
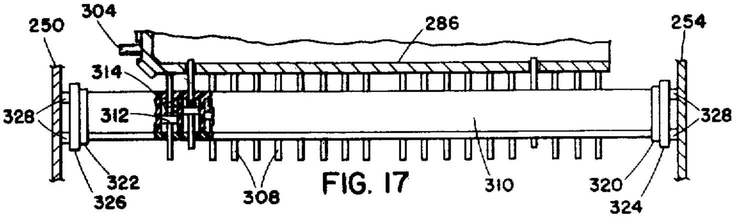

Fig. 17 shows in partial section a view from above the viewer mechanism of Figs. 16*a* and 16*b* showing its position relative to the drum calibration means.

Figure 18A:
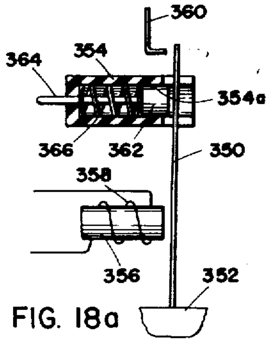
Figure 18B:
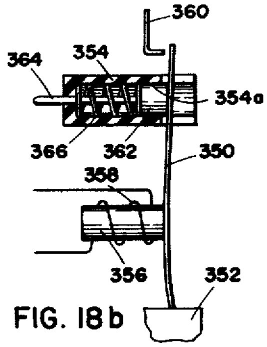
Figure 18C:
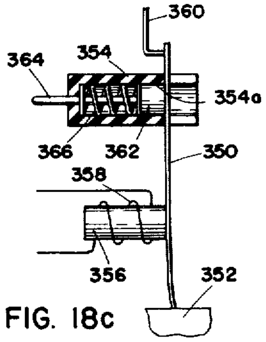

Figs. 18*a*, 18*b* and 18*c* illustrate, in section, a modified form of viewer mechanism suitable for use in the pre-set version of the present invention.

Figure 19:
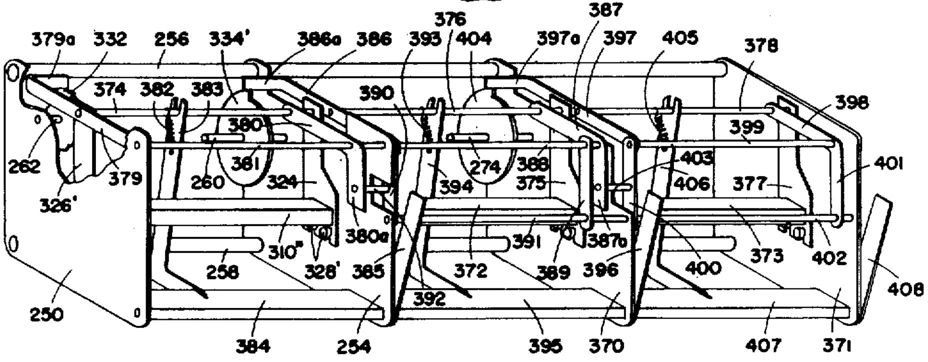

Fig. 19 is a perspective view showing the skeleton of a pre-setting counter frame, viewer mechanism and cam linkages.

Figure 20:
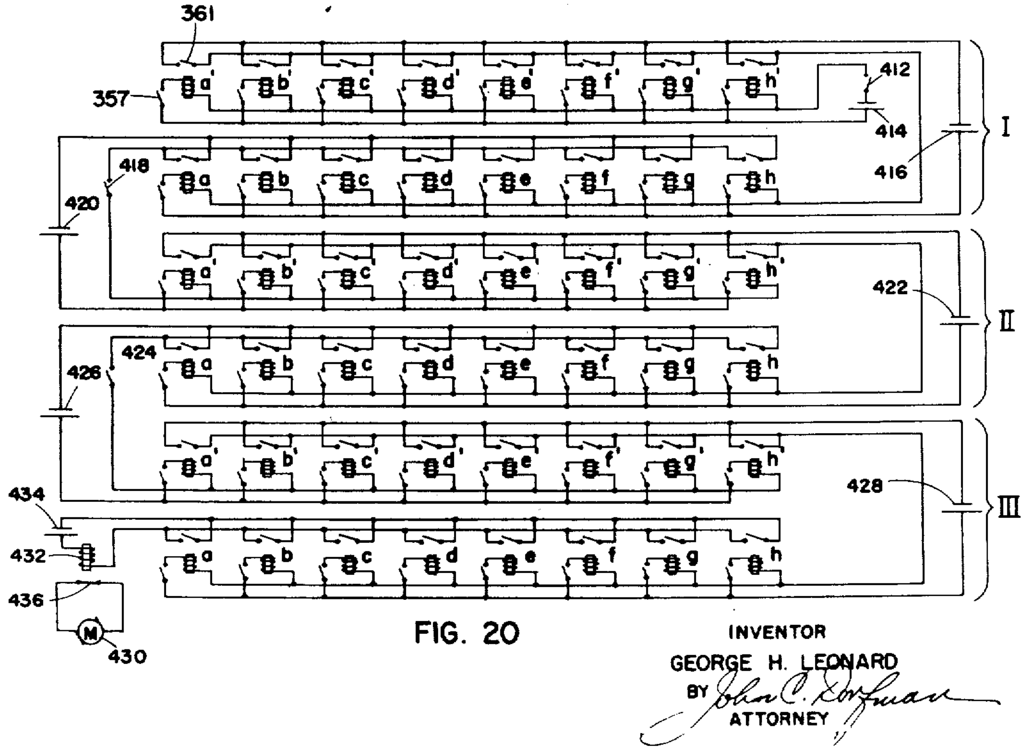

Fig. 20 is a circuit diagram showing relays and switches which would be employed in one possible version of a pre-set counter.

Figures 21A, 21B:
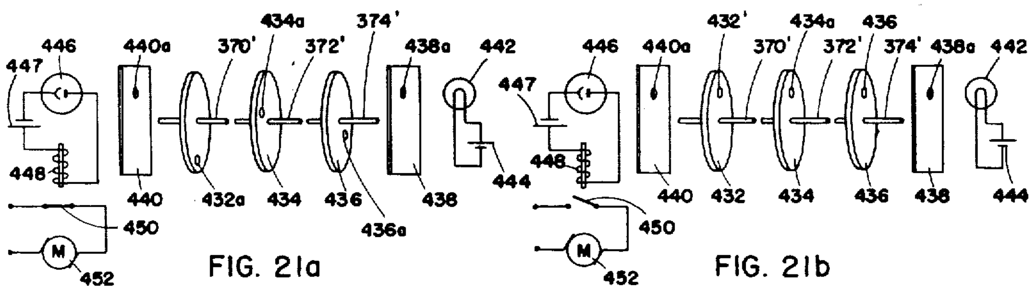

Figs. 21*a* and 21*b* illustrate schematically a photoelectric system for indicating the zero position of a counter.

Figure 22:
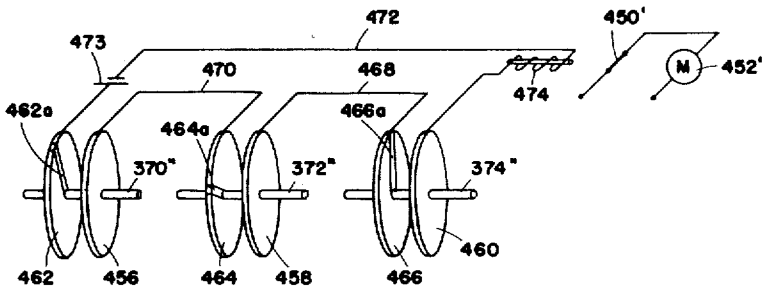

Fig. 22 illustrates schematically an alternative system for indicating the zero position of a counter.

Figure 23:
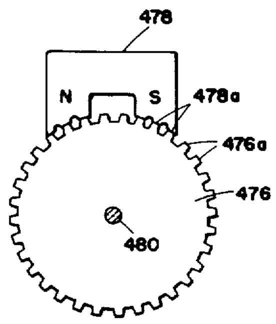

Fig. 23 illustrates in elevation a modified form of the discrete position selection means of Fig. 1.

Figure 24:
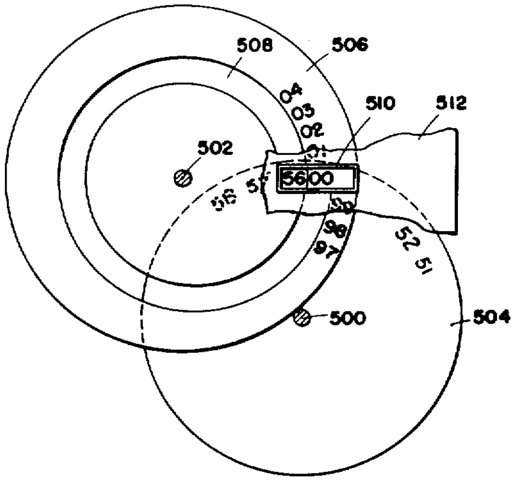

Fig. 24 illustrates in partial section a simple two-shaft visual counter which employs a modified form of the present invention.

Figs. 1–6 illustrate a preferred form of the invention. The basic parts of any counter of this type are the reference frame and the counting shaft or shafts, which are rotatable relative to the frame. The reference frame in this instance is advantageously composed of six parallel plate members 20, 22, 24, 26, 28 and 30 and a pair of parallel columns, generally designated 32 and 34, which columns join the plates. Plates 20 and 26 in this preferred form are essentially square; plates 22 and 24 are of generally similar shape but have large areas cut away to permit passage of structural parts; plates 28 and 30 are advantageously rectangular and have approximately only half the width of plates 20 and 26 in one dimension. As may be seen in Fig. 3, the columns are perpendicular to the plates, through the two adjacent corners of which they pass. As may be seen in Fig. 1, column 32 in this structural version is composed of segments 32*a*, 32*b*, 32*c*, 32*d* and 32*e* which are connected together by pin members passing through the plates which they space from one another. Column 34 is similarly segmented for the same purpose. All the parts of the frame are joined rigidly together in this manner so that there can be no relative motion between any of them.

Three counting shafts 36, 38 and 40 are rotatably mounted relative to the frame. Since shaft 36 is the highest speed counting shaft it may be mounted upon plates 20 and 22 using frictionless bearings (i. e. ball bearings) 42 and 44. For most applications shafts 38 and 40 may be mounted in simple journaled bearings, shaft 38 which lies between plates 28 and 24 being mounted upon plates 28 and 24 and shaft 40 which lies between plates 30 and 26 being mounted upon plates 30 and 26.

Intermediate the plates 22 and 28, shaft 36 is gear coupled to shaft 38 in a speed reduction ratio. More specifically shaft 36 is terminated in a small gear 46 which is meshed with a larger gear 48 on another shaft which is rotatably supported on plates 22 and 38, which shaft is a small diameter gear 50 over a large part of its length. Gear 50 is in turn meshed with larger gear 52 which is mounted on the end of shaft 38.

In similar manner, intermediate the plates 24 and 30, shaft 38 is gear coupled to shaft 40 in a speed reduction ratio. More specifically, shaft 38 is terminated in a small gear 54 which is meshed with a larger gear 56 on another shaft (not visible), which is rotatably supported on plates 24 and 30 and which shaft provides a small diameter gear similar to gear 50, over a large part of its length. This small diameter gear is, in turn, meshed with larger gear 58 which is mounted on the end of shaft 40.

Mounted in a fixed position on each of the counting shafts is the calibration means. A plurality of parallel disks coaxially mounted on each of said shafts is employed as calibration means. The disks on shaft 36 are generally designated 62, those on shaft 38 are generally designated 64, and those on shaft 40 are generally designated 66.

A separate viewer mechanism is mounted on the frame for cooperation with each calibration means. Each viewer mechanism employed in this instance advantageously consists of a pair of close spaced parallel sheet metal members which are fixed together and between which are arranged a plurality of flat elongated sensing fingers each of which is free to move independently of the others in the direction of its elongation. There are as many sensing fingers as there are disks in the particular calibration means. Each of the sheet metal members has perpendicular mounting flange so arranged that the flanges lie approximately in a plane but extend in opposite directions. Using these mounting flanges the viewer mechanisms are so mounted that the sensing fingers extend toward the appropriate part of the calibration means in a generally radial direction.

More specifically, the viewer mechanism which cooperates with calibration means 62 is composed of parallel sheet members 70 and 72, spaced apart at opposite ends by spacer members 74 and 76 and riveted together through said spacers by rivets 78 and 80. Sensing fingers, generally designated 82, are held between the members 70 and 72 and between spacer members 74 and 76 and operate like the fingers 102′ in Fig. 14, the operation of which will be explained hereafter. The mounting flanges are 70*a* and 72*a* respectively, with flange 72*a* mounted and fixed in position by means of screws 86 and 88 to elonme member 84 which is fixed at its ends to plates ; of the reference frame.

ewer mechanism which cooperates with calibrans 64 is composed of parallel sheet metal memmd 92 spaced apart at opposite ends by spacer 94 and 96 riveted together by rivets 98 and 100. ing fingers are generally designated 102. The ; flanges are 90a and 92a respectively, with flange bly mounted by pin means 104 and 106 on fixed member 84. The pins 104 and 106 permit it along slots 108 and 110 in flange 92a in such r that movement of the viewer mechanism can a direction generally perpendicular to the parıbers 90 and 92.

ewer mechanism which cooperates with calibrais 66 is composed of parallel sheet members 112 paced apart at opposite ends by spacer members 118 and riveted together by rivets 120 and 122. ing fingers are generally designated 124. The flanges are 112a and 114a, respectively, with 4a slidably mounted by pin means 126 and 128 elongated member 84. The pins 126 and 128 ovement along slots 130 and 132 in such a manmovement of the viewer mechanism can occur ion generally perpendicular to the parallel memınd 114.

ient of the sensing fingers toward the calibration each instance is accomplished by the action of pring members, one for each sensing finger, ings extend through small holes in said sensing a direction generally perpendicular to the fingers. ps of springs acting upon the sensing fingers 82 ılly designated 136. The groups of springs actthe sensing fingers 102 are generally designated e, groups of springs acting upon the sensing 4 are generally designated 140. All of these e advantageously mounted on a common bar 142 which in this instance extends the length ucture and which is fixed to one of the large ices of long narrow plate 144 adjacent one of edges thereof. Said plate 144, which also exlength of the frame, is, in turn, rotatably mountlates 20 and 26 of said frame by pin means 146

Rod member 150 extends along the opposite ie same surface of plate 144, i. e., on the same of as conductor bar 142, and is fixed thereto by r of brackets 152 each of which may be held in single screw 154. Rod member 150 is longer 144 and its ends extend through or partially lots in plates 20 and 26. These slots limit the of rod 150, hence the rotation of plate 144 146 and 148. Rotation of plate 144 and the affixed to it is conveniently accomplished by 6 (see Fig. 5) which is advantageously coma piece of sheet metal parallel to end plate 26 e 156a perpendicular thereto. The handle is to rod 150 and is made rotatable relative to the pin connection 148 by which it is also connected 144. Spring 158 connected between rod 150 26 of the frame tends to hold plate 144 in the ling position of the counter. Movement of the opposition to the spring moves plate 144 and nbers acting in response to its movement into ing position.

1 of each of three lever arms 160, 162 and 164 y connected to rod member 150. A rod memnected to the other end of each of these lever d member 166 is connected to lever arm 160; er 168 is connected to lever arm 162; and rod 70 is connected to lever arm 164. These rods se lie generally parallel to rod 150.

6 has one end connected to plate 22 in such a at it is free to move a limited amount about tion. Its other end extends through a slot in nd is terminated in a pin 172 of small diameter.

Pin 172 cooperates with gear-like dial disk 174 which is mounted on shaft 36 on the outside of the frame as defined by plate 20 (see Fig. 6). Disk 174 has as many depressions 176 as there are members represented by the various calibrations assigned to shaft 36 relative to the frame. These depressions are barely wider than pin 172 and so arranged that the pin detent cannot enter one of the depressions unless the calibration means on the shaft 36 is squarely opposite its viewer mechanism.

The rods 168 and 170 lie in slots in one end of lever arms 162 and 164, respectively, and in each case the rod is spring connected to the lever arm by springs 178 and 180, respectively. These spring couplings tend to pull the rods downward into the slots, toward the other end of their respective lever arms. When said downward movement of the rods is opposed, however, the rods, in turn, oppose the urging of the springs and yet remain in their respective slots. The rods 168 and 170 are also fixed to flange members 90a and 112a, respectively, by means of flange appendages perpendicular to said rods at opposite edges of said flanges. The ends of rod 168 are connected to lever arms 182 and 184, the ends of which lever arms are, likewise, connected by axle member 186 which axle is rotatably mounted between plates 22 and 24. The ends of rod 170 are connected to lever arms 188 and 190, the ends of which lever arms are, likewise, connected by axle member 192. The axle member 192 in this instance is not connected to the frame but rather to two other members, as will be described later. Lever arms 182 and 188 each have free ends which extend beyond rods 168 and 170, respectively, and are terminated in portions 182a and 188a which are suitable for following a cam. Cam follower 182a cooperates with a cam 194 and cam follower 188a cooperates with a cam 196.

The cams are disk-like members in a spiral form mounted on shafts 36 and 38, respectively, perpendicular thereto and parallel to the calibration means. Each of these cams has a step or discontinuity which is aligned with the calibration means. Thus, the discontinuity in the cam on a faster shaft is effective to produce readjustment of the viewer mechanism cooperating with the next slower shaft and its calibration means at the change-over point corresponding to the point at which the faster shaft finishes one complete revolution, e. g., that point at which the calibration means on the same shaft with the cam indicates a change back to zero.

As previously mentioned axle member 186 is rotatably mounted on plates 22 and 24 of the frame. However, axle 192 is rotatably mounted between parallel lever arms 198 and 200 at one end of each of said arms. The other ends of the arms 198 and 200 are rigidly fixed to opposite ends of axle member 202 which is rotatably mounted upon and between plates 24 and 26 and perpendicular thereto.

Triangular plate 184 actually provides two lever arms which are rigidly connected together at approximately 90° to one another. A pin 204 is fixed to lever arm 198 and extends laterally across to a groove 206 in triangle 184 at a position which causes it to provide the shorter lever arm. Thus, a rotational movement of the longer lever arm of triangle 184 will produce a relatively smaller rotational movement of the shorter lever arm.

The cam members 194 and 196 bear pins 208 and 210 respectively, each of which extends in a direction parallel to the shafts. A socket (not shown) for receiving pin 208 is formed in gear 52 at the same distance from the axis of rotation (since shafts 36 and 38 have a common axis of rotation) as the pin 208. Likewise, a socket (not shown) for receiving pin 210 is formed in gear 58 at the same distance from the axis of rotation (since shafts 38 and 40 have a common axis of rotation) as the pin 210. An extension 212 from plate 30 of the frame toward gear 58 also bears a pin 212a designed to cooperate with a socket (not shown) on said gear 58 for receiving it. The shafts 36, 38 and 40 are all designed to move under axial pressure axially toward the plate 26 thereby permitting the successive engagement of each of the three pairs of pins and sockets aforementioned. Normally these shafts are held in proper operating position by spring means urging them axially toward plate 20. The shaft which extends between plates 22 and 28 which mounts gears 48 and 50 may not be movable, but gears 48 and 50 are advantageously coupled together or to the shaft in such a way that they normally rotate together at the same speed but so that, when opposing forces act to drive them in opposing directions, one of them is able to slip relative to the other. Likewise the shaft which extends between plates 24 and 30 and which mounts gear 56 and a second gear which cooperates with gear 58 so that said gear meshing with gear 58 is able to slip relative to gear 56 when opposing forces act to drive these gears on the same shaft in opposite directions.

A plurality of switch contact elements which cooperate with spring members 138 are provided by relatively rigid metallic strips generally designated 214, which lie parallel to said spring members 138 and each of which has a flange 214*a* at one end extending toward a spring member 138 (see Fig. 3). Each of said strips 214 is supported by a flange 214*b* at its other end which is insulated from plate 144 by insulator strip 216 and fixed to said plate 144 by insulator bar 218 which in turn is held in place by screws 220. Thus the strips 214 are insulated one from another and may be individually connected to wire members 222. Strips 224 which cooperate with spring members 136 are mounted similarly to strips 214. Likewise, strips 226 which cooperate with spring members 140 are mounted similarly to strips 124.

Figure 2:
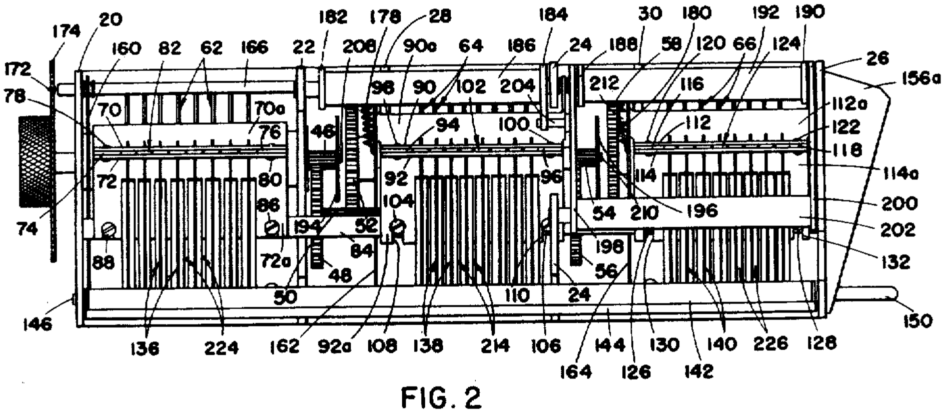
Fig. 2 is a side elevational view of the device of Fig. 1 showing, in particular, the viewer mechanisms employed with this counter.

In order for the counter to be most effective, it should be zero set before counting. That is, the position of the calibration means relative to their respective viewer mechanisms on all shafts must be such that their collective reading is zero. This is simply accomplished in structures of the Figs. 1–6 type by taking advantage of the ability of the shafts to move in a direction along their common axis toward plate 26 and out of their operating positions as illustrated in Figs. 1 and 2. Such movement of shaft 36 causes the advance of cam 194 and pin 208 which it urges toward gear 52. Rotation of shaft 36 while the axial pressure thereon is maintained will cause pin 208 to find its socket in gear 52 thereby arranging calibration means 62 and 64 on shafts 36 and 38 in the proper positions relative to one another for ultimate zero adjustment. The axial advance of shaft 38 then causes the advance of cam 196 so that pin 210 is urged toward gear 58. Rotation of shaft 38, due to rotation of shaft 36 to which it is coupled, while axial pressure is maintained, will cause pin 210 to find its socket in gear 52 thereby arranging calibration means 62, 64 and 66 on shafts 36, 38 and 40 in their proper positions relative to one another for ultimate zero adjustment. With the calibration means on all the shafts thus properly arranged relative to one another, there only remains the proper arrangement of the calibration means relative to the frame. Proper zero arrangement relative to the frame is permitted by axial movement of shaft 40 and gear 58 mounted thereon together with rotation of gear 58 until pin 212*a* is able to find its socket in gear 58 completing the zero adjustment. Once the zero adjustment is complete the pin and socket couplings may be broken and the shafts moved axially back to their original positions, being careful to avoid any rotational movement in the process.

In its preferred form, the counter of Figs. 1–6 has a capacity of 1,000,000 units. This capacity is achieved by coupling together the counting shafts with successive 100:1 reductions in speed. The fastest shaft 36 is calibrated to represent 100 units by placing calibrations 1/100 of a revolution apart on the calibration means. Thus the fastest shaft records from 00 to 99 and provides the units and tens digits of the counter reading.

With the 100:1 speed reduction between shaft 36 and shaft 38, shaft 38 will make 1/100 of a revolution for each full revolution of shaft 38. Thus, 1/100 of a revolution of shaft 38 is equivalent to 100 units. Accordingly shaft 38 is calibrated so that, in a full revolution of shaft 38, it will register from 00 to 99 hundreds of units or the hundreds and thousands digits of the counter reading.

The 100:1 speed reduction between shaft 38 and shaft 40 means that 1/100 of a revolution of shaft 40 is equivalent to 10,000 units. Accordingly, the shaft 40 is calibrated so that in a full revolution of shaft 40, it will register from 00 to 99 ten thousands of units or the ten thousands and hundred thousands digits of the counter reading.

It is to be understood that the present invention is not limited to a counter having a capacity of 1,000,000 units. Additional counting shafts having speed reductions of 100:1 from the immediately faster shaft may be employed to increase the capacity. It is not advisable to increase the capacity by increasing the number of calibrations per shaft to 1000 and employing 1000:1 speed reduction between shafts because 1/1000 of a revolution too closely approaches the order of magnitude of the mechanical error of the system due to normal machining tolerances and allowable clearances of cooperating parts. For convenience in reading the counter it is advisable to employ only an integral power of ten as the number of calibration units to be employed with a given shaft, including those shafts whose calibration units are determined by their speed reduction ratio with respect to one. However, the present invention is not confined to a decimal system of calibration. In fact, the invention is applicable no matter how many unit calibrations are employed per shaft.

In order to present a graphic and simple illustration of the application of the present invention and in order to facilitate the understanding of the principle of operation of its preferred form, a visual type counter which may be adapted to employ some of the features of the present invention will be described before the operation of the preferred form of the invention is described.

The odometer dial-type counter illustrated in Fig. 7*a* is a smooth running visually read counter of the type employed by the present invention, which counter employs shafts which move relative to one another at fixed speeds. The arrangement of Fig. 7*a* is a mirror image of the arrangement of the Fig. 1 arrangement. This visual type counter is arranged with the fastest shaft to the right so that any number represented visually by said counter may be directly read by successively reading the digits from left to right.

The visually read counter of Fig. 7*a* is perhaps the simplest type of counter to which my invention is applicable. Although Fig. 7*a* is largely schematic in its representation of a counter, if the counting shafts 36′, 38′ and 40′ and small gear shafts 37 and 39 were rotatably mounted on a frame, the basic counting operation of this structure would be quite similar to that of the Fig. 1 structure. In this case a speed reduction of 10:1 is obtained from gear 46′ to gear 48′ and an additional speed reduction of 10:1 is obtained from gear 50′ to gear 52′. Thus a speed reduction of 100:1 is obtained from shaft 36′ to shaft 38′. Likewise a speed reduction of 10:1 is obtained from gear 54′ to gear 56′ and an additional speed reduction of 10:1 is obtained from gear 57 to gear 58′. Thus a speed reduction of 100:1 is obtained between shafts 38′ and 40′.

The calibration means 62′, 64′ and 66′ on each of the shafts 36′, 38′ and 40′ respectively is a type suitable for visual reading. More specifically, it is a narrow cylindrical dial arranged coaxially with the particular shaft to which it is rigidly attached. Each dial is calibrated with 100 consecutive numbers from 00 to 99 which are marked thereon at equal intervals. In order to read the number represented by a given combination of positions of the shafts, the positions of the shafts, or more specifically, of their calibration means, relative to some reference point or viewer mechanism on the frame must be consulted. It is convenient in this case to provide a simple viewer mechanism by means of rectangular windows in shallow cylindrical can-like housings 82', 102' and 124' which are fixed relative to the frame so that they do not rotate with the shaft. The numbers on the dial may be seen through the window. The size of the numbers on each of the dials and the size of the window in each of the viewer mechanisms has been exaggerated for the sake of clarity.

Reading a number on the dials through the window of the viewer mechanism is difficult in most cases because the pair of digits represented by a particular position of a given shaft does not line up squarely with the window, i. e., part of another number shares the window. The confusion of this situation may be seen in the reading appearing on the dial of Fig. 7*a* which should properly indicate 707, 525.

Fig. 7*b* shows how confusion can result with the counting shafts of Fig. 7*a* in three different positions indicated by A, B, and C to represent the numbers 000050; 005050; and 999999 respectively. Fig. 7*c* shows how the application of my invention to the structure of Fig. 7*a* will permit accurate reading of the number represented. As is indicated schematically, the viewer mechanisms, including the windows 62', 64' and 66', are moved to positions squarely opposite the proper calibrations for reading the counter.

Fig. 8 shows in perspective, schematically, the system of Fig. 7*a* with elements of the present invention added. The parts similar to those of Fig. 7*a* are indicated by the same number with an added prime. The viewer mechanism 82'' is fixed relative to the frame, but each of the viewer mechanisms 102'' and 124'' is permitted sufficient movement to permit it to be moved squarely opposite a calibration over the entire range of positions occupied by that particular calibration while it represents the proper reading of the counter. That fractional part of a revolution between calibrations or its equivalent must then be the range covered by the viewer mechanism. When a reading is to be taken, shaft 36'' is stopped at one of 100 discrete positions at which the calibration is squarely opposite the viewer by the cooperation of gear-like dial disk 174' and detent member 172' at the end of arm 166'. Disk 174' and detent 172' are made so that they will not properly cooperate unless the calibration on dial 62 is squarely in view. When thus stopped, cam follower **182*a'* at the end of lever arm 182' is brought to bear upon the spiral edge of disk-like cam member 194' which is also mounted on shaft 36''. This cam surface is so arranged as to cause viewer mechanism 102'', which is connected to lever arm 182' by linkage arm 90*a'*, to squarely find the proper calibration by virtue of its proper relationship with the calibration means of shaft 36'' and cam 194'. In a similar manner, cam follower 188*a'* at the end of lever arm 188' is brought to bear upon the spiral edge of disk-like cam member 196' which is mounted on shaft 38''. This cam surface is also arranged to cause its cooperating viewer mechanism 124'', which is connected to lever arm 188' by linkage arm 112*a'*, to squarely find the proper calibration by virtue of its proper relationship with the calibration means of shaft 38'' and cam 196'**. It is inherent in this type counter that the shafts, and hence their calibration means, bear a relationship to one another such that, for every number represented by the counter, there is but one discrete position of each calibration means relative to the frame and the other shafts and calibration means. Furthermore, the proper relationship of a cam on a faster shaft relative to a calibration means on a slower shaft makes it requisite that the cam's cam follower be opposite the step or discontinuity in said cam at the exact change-over point from one calibration to the next on the calibration means being viewed by the affected viewer mechanism. When this relationship exists, the cam is positioned so that it determines the proper position of the viewer mechanism which reads the calibration on the slower shaft in terms of the position of the calibration means on the faster counting shaft. Thus it is that all of the cams, as well as all of the calibration means, must be relatively oriented so that the calibration means are in their correct relative positions and so that each viewer mechanism will be at all times squarely opposite the proper calibration on the calibration means with which it cooperates.

As a practical matter, with a true spiral cam, the rate of movement of the viewer will differ slightly at different positions of the mechanism due to the nature of the coupling between the cam follower and the viewer mechanism. If it should become necessary to have a uniform rate, the shape of the cam may be modified.

The operation of the preferred counter of Figs. 1–6 is basically quite similar to the operation of the counter of Figs. 7*a* and 8. The coupling to the device producing rotation of the counter is not shown. However, in counting, the shaft 36 is preferably the driven shaft which is positively coupled to the other counting shafts 38 and 40 to produce their rotation in a manner previously described. While the counter is counting, other than at the bearings, no contact is made between the rotating members, including the counting shafts, their calibration means and the associated cams and the frame members, including the frame itself, the viewer mechanism, the cam followers and associated linkages.

The calibration means and cam member on each shaft are fixed relative to one another and to the shafts. The shafts are positively coupled together so that there is a positive interrelationship between shafts which insures that the combination of positions of the various calibration means and cam, which combination represents any given number, will always be the same. While the counter is counting it may be monitored, as by a photo-electric system, in order to obtain a running count. However, in order for an accurate count reading to be made in the intended manner the rotation of the counting shafts must stop.

In making a count reading, the lever arm handle 156, which is illustrated in Fig. 5, is pressed inward toward the counter in opposition to spring 158. What happens when the handle is pressed in this manner may be seen in part by reference to Figs. 9*a*, 9*b* and 9*c* which are essentially the view of Fig. 3 with much of the detail removed.

Referring to Figs. 9*a*, 9*b*, and 9*c*, the action of the cam, the cam follower, the viewer mechanism and the associated linkages is illustrated. These figures are schematic in that they show only those parts of the apparatus which have application to the interrelationship of the calibration means and the viewer mechanism. Movement of lever 156 from the position shown in Fig. 9*a* to the position shown in Fig. 9*c* causes plate 144 to rotate on the same axis as lever handle 156 about pins 148 and 146. Rod 150, to which both plate 144 and lever 156 are attached, moves downward and describes a small arc about the axis of rotation through pin 148. Lever 162 which is affixed to rod 150 at one end is pulled downward. Spring 178 urges rod 168 to the bottom of the slot in the other end of lever 162 no matter what the position said lever assumes. Hence the downward movement of lever 162 tends to pull rod 168 downward. Rod 168 is affixed to lever arm 182 and to the appendages of flange **90*a* of the viewer mechanism so that these members also tend to be moved downward. Thus, with pressure exerted on lever 156, the lever 162 acts to pull rod 168, together with the viewer mechanism 90—92 and lever arm 182**, to the position of Figs. 9*b* and 9*c*. How far down rod 168 and the viewer mechanism can be moved is determined by cam follower **182*a* which stops the downward movement of these members when it comes into contact with cam 194 on shaft 46. The lever 182 which is terminated in cam follower 182*a* pivots about its pivoted connections to the frame supplied by axle 186. Because of the position of shaft 36 and its calibration means and hence cam 194**, which is aligned with the calibration means in Fig. 9*b*, the viewer mechanism is positioned near the upper end of its reading range. In such a position, rod 168 is held almost a maximum possible distance away from the bottom of the slot in the end of lever arm 162 despite the urging of spring 178 tending to pull rod 168 to the bottom of the slot. In Fig. 9*c*, however, the viewer is at or near its lowest reading position, just after a number change-over. The viewer mechanism is capable of vertical movement to properly adjust its position relative to the calibration means due to its slidable mounting on frame member 84. The viewer mechanism is fixed to the frame by pins like pin 104, which ride in slots in flange 92*a* in order to permit vertical movement of the viewer to follow the calibrations on shaft 38. Since the arc for $1/100$ revolution at the radius of the viewer mechanism differs only slightly from a straight line, vertical movement of the sort described is adequate. Thus the cam adjustment of the viewer mechanism is essentially the same as that in Fig. 8. The cam is so oriented as to keep the viewer mechanism squarely opposite the proper calibration at all times.

Lever 160 is also attached to rod 150 so that the operations of handle 156 will also cause downward movement of said lever. Lever 160, because of its direct connection to rod 166 at its opposite end, tends to pull rod 166 downward about its pivot support at one end so that detent pin 172 at its other end is brought into engagement with the edge of disk 174 (see Fig. 6). Handle 156 cannot be completely closed, and hence a reading cannot be taken, unless pin 172 enters one of the depressions 176 in the edge of disk 174. The system may be arranged so that it will rotate backward or forward a small angle to the nearest position where a depression will receive the pin. When pin 172 is received in a depression, a calibration on the calibration means 62 on counting shaft 36 will be squarely opposite viewer mechanism 70—72. Thus one possible means of obtaining accurate readings of the calibration means of counting shaft 36 is to stop said shaft only when a calibration is squarely opposite the viewer mechanism, using only as many discrete stopping positions as there are calibrations on the shaft.

Lever 164 is also attached to rod 150 so that the operation of handle 156 will cause its downward movement. The downward movement of lever 164 will also tend to produce downward movement of rod 170 with the result that cam follower 188*a* will contact cam 196. After follower 188*a* contacts cam 196, rod 170 can move no further despite the urging of spring 180 as lever 164 continues its downward movement. Accordingly, the position of viewer mechanism 112—114 is determined in this manner.

It should be noted in connection with the action of the cams 194 and 196 that they produce a range of heights of the cam followers 182*a* and 188*a* respectively which will assure that the proper viewer mechanism squarely opposes the proper calibration over the full range of positions of that calibration while it represents the proper reading. At the change-over point for the calibrations, the change takes place at exactly the right time. For example, since the shaft has 100 calibrations representing 100 units and, since it stops at only 100 discrete angular positions relative to the frame, when counting shaft 36 is in the position representing the number 99 the viewer mechanism 90—92 is at the top of its range squarely opposite its proper calibration on shaft 38. Within the span of $1/100$ revolution of shaft 36 between the positions of shaft 36 representing the consecutive numbers 99 and 100, the shoulder or discontinuity of cam 194 is passed. Thus, when the cam follower is brought to bear against cam 194 in the 00 position of shaft 36, the viewer mechanism 90—92 will be lower than its position with number 99 by an amount which is the equivalent of $1/100$ revolution of shaft 38 so that it is squarely opposite the calibration on shaft 38 occurring next after the one which had been read when shaft 36 was in the 99 position.

If the number were changing from 9999 to 10000, cam 194 on shaft 36 would move $1/100$ of a revolution, but cam 196 on shaft 38 would move only $1/10000$ revolution. Even though cam 196 had been aligned with the calibration means on shafts 38 and 40 with extreme precision, the lost motion in the gear system or other conditions produced by clearances and tolerances might produce sufficient error in the position of the shaft 40 relative to the cam 196 to prevent the change-over from occurring were cam follower 184*a* to be mounted and to operate like cam follower 182. Accordingly, this invention has provided means for solving this problem whereby the movement of follower 188*a* is referred back to the movement of follower 182*a*. As a result of referring back to the previous cam and follower, a type of movement, similar to that imposed on viewer mechanisms, is employed. Instead of assuming a position squarely opposite a given point or calibration on the calibration means, however, the cam follower 188*a* assumes a position squarely opposite a given point on the cam 196. By this arrangement the cam follower is made to squarely oppose one of 100 discrete positions on cam 196 for a full revolution of counting shaft 38. In order to be able to "follow" a given point on the cam as well as to be brought into contact with the cam 196, the follower 188*a* must have two degrees of movement. These two degrees of movement are made possible by the "double jointed" mounting of lever 188. Lever 188 is rotatably connected to lever 198 through axle 192. Lever 198 is, in turn, rotatably connected to the frame plate 24 through axle 202. As shown, lever 188 effectively has a horizontal movement, representing a small arc of rotation of lever 198 about axle 202, superimposed upon its normal essentially vertical movement. The mechanism producing the horizontal movement of follower 188*a* is not unlike the linkage systems producing movement of viewer mechanism. The linkage in this instance, consists primarily of triangular crank 184 which provides a larger lever arm and a shorter lever arm arranged at an angle of approximately 90° to one another. The longer lever arm parallels lever 182 and, because it is fixed relative to lever 182 by rod 168 and axle 186, said longer arm moves in synchronism with lever 182. The shorter lever arm is connected by pin 202 to lever 198 which it generally parallels. The effect of pin connection 202 is to cause cam follower 188*a* to be moved horizontally to oppose the same discrete point on the cam for one full revolution of shaft 38 or $1/100$ revolution of shaft 40. When follower 182a reaches the discontinuity in cam 194, the drop or change-over which occurs causes cam follower 188a to move $1/100$ revolution to its next point. If the count changes from a number ending with the digits 9999 to a number ending 0000, the movement of follower 188*a* wil cause it to pass the discontinuity in cam 196, provided, of course, that the cams having been properly arranged with respect to one another.

Any number of additional slower counting shaft stages may be employed with the same high degree of accuracy despite lost motion and other errors by using this "double jointed" type of structure. In each case the movement of the viewer mechanism on the added counting shaft depends upon the action of a cam follower cooperating with a cam on the next faster shaft. The movement of the cam follower because of its double jointed mounting is referred back to previous cam follower which cooperates with a cam on the shaft two stages back from the shaft on which calibration means to be viewed by the affected viewer mechanism is mounted. Thus the system is essentially the same as that described above and operates in essentially the same manner.

The calibration means in the Figs. 1–3 preferred type of structure are advantageously composed of a plurality of parallel disks. These disks are advantageously affixed perpendicular to a piece of tubing which snugly fits the counting shaft involved. One end of the tubular member is advantageously terminated in a bushing having thicker walls than the tube. A set screw may extend through the bushing to engage the shaft, thereby holding the whole calibration means assembly in a fixed place on said shaft. All of the assemblies in Fig. 1 are made in this manner. The calibration means generally designated 64 may be considered for example. Therein the disks 230 are coaxially affixed perpendicular to tubular member 232 which terminates in bushing 234. Radial set screw 236 penetrates the bushing 234 to fix the assembly to shaft 38.

One method of calibrating the disks 230 is shown in Figs. **11*a* and 11*b***. This method involves making a plurality of teeth in the periphery of each disk, thereby forming peaks and valleys along said periphery. Viewing then involves "seeing" a combination of peaks and valleys of the calibration means along a line parallel to the axis of rotation of the shaft. Every such possible combination can represent only one number.

Because a binary type code is applied to the disks, only eight disks, here lettered A–H, are required to represent 100 numbers when mounted on the shaft as shown in Fig. 11*b* so that the relative positions of the peaks and valleys along their edges correspond to the arrangement in Fig. 11*a*. The system of Fig. 11*a* may be said to employ four disks (A, B, C and D) for the units digit and four more (E, F, G and H) for the tens digit. Thus, it is possible to use the same pattern for the tens digit as for the units digit where the units digit repeats the pattern 10 times to every one time by the tens digit. The following table shows the different combinations which represent the digits 0–9 in the patterned arrangements of disks A, B, C and D, and also disks E, F, G and H, in Fig. 11*a*:

| Units or tens digit | Calibration opposite viewer mechanism | | | |
|---|---|---|---|---|
| | A or E | B or F | C or G | D or H |
| 0 | Peak | Peak | Peak | Peak. |
| 1 | Valley | do | do | Do. |
| 2 | Peak | Valley | do | Do. |
| 3 | Valley | do | do | Do. |
| 4 | Peak | Peak | Valley | Do. |
| 5 | Valley | do | do | Do. |
| 6 | Peak | Valley | do | Do. |
| 7 | Valley | do | do | Do. |
| 8 | Peak | Peak | Peak | Valley. |
| 9 | Valley | do | do | Do. |

Other systems employing codes other than a binary code are also possible, but they may well require many more than four disks per digit.

Figs 12*a* and 12*b* show a viewer mechanism similar to those of Fig. 1. This type of mechanism records the calibration pattern which it "sees" opposite it on the disks. Actually the viewing is done by touch in this instance. The viewer mechanism consists of a pair of parallel plates 90′ and 92′ which are held together by rivets 100′ or like means. Between the plates 90′ and 92′ are a number of finger members 102′ corresponding to the number of disk members 230′ employed. These finger members 102′ are advantageously flat, essentially radially positioned strips of dielectric material arranged parallel to the plates 90′ and 92′ with elements of their longest dimension parallel to the plane of the disks. One end of each finger is able to make contact with the edge of a disk 230′ and is sufficiently thinner than the smallest valley to fit therein without difficulty. In the Figs. 12*a* and 12*b* structure, the finger members 102′ are urged toward the disks by rotation of bar 142′ about an axis through pin 148′ rotatably mounting said bar to the frame. This rotational movement causes rod-like metallic springs 138′, which are fixed to bar 142′ and which pass through dielectric finger 102′, to bear against said fingers and urges them toward the disk 230′. If the finger contacts the disk at a peak as is shown in Fig. 12*b*, the spring member is bowed away from contact member 214′ which is mounted on insulation member 218′ and hence out of contact with conductor 142′. On the other hand, if the finger contacts the disk in a valley, the spring member is not bowed because it can urge the dielectric finger into the valley sufficiently far to permit it to remain straight. Thus contact with member 136 is maintained and may be recorded remotely from the counter because of conductor connections 222′ and 240. Arm member 162′ is connected between the rotatably mounted members and flange **92*a*′ of the viewer mechanism and tends to move said mechanism downward. Flange 90*a*″ of the viewer mechanism is connected by rod 168′ to a lever arm following a cam as previously described and hence is retarded from downward movement in accordance with the cam position. A slotted connection between arm 162 and the viewer mechanism allows for the different positions of the cam, and a spring member 178′** tends to urge the viewer to the lowest position possible in opposition to the cam action.

In the structure of Figs. 1–3, especially as seen in Fig. 3, the viewer mechanisms are similar to those of Figs. 12*a* and 12*b*. For example, dielectric finger members such as 102 are held between parallel plates 90 and 92 which plates are fixed together at their ends by rivets 98 and 100. The force provided by spring members 138 to move the fingers 102 is much the same with the corresponding members of Figs. 12*a* and 12*b*. The same thing is true of the action between spring members 138 and contacts 214 which are, however, differently insulated as previously described. Lever arm 162 in the preferred version is, of course, connected to rod member 168 instead of to flange **92*a*, and the spring 178 is accordingly connected between said rod and said lever arm. The slot permitting different positions of the viewer mechanism relative to the lever arm 162** is in the arm instead of in the flange of the viewer mechanism as in Fig. 12*a*.

It is, of course, essential to accurate readings that the viewer mechanism assume its proper reading positions before its sensing fingers come in contact with the calibration means. Thus the sequence of action as handle 156 is closed must be, first, for the cam followers **182*a* and 184*a* and detent 172 to find their positions on cams 194 and 196 and disk 174, thus determining the position of the viewer mechanism, and, then, for the spring members 136, 138 and 140 to cause sensing fingers 82, 102 and 124 to contact calibration means. Rotation of mounting plate 144 and conductor bar 142 is limited so that when the handle 156 is fully closed, if a valley is opposite a sensing finger, the spring member will force said finger to its bottom, at which point said spring 136, 138 or 140 will touch contact 224, 214 or 226, respectively. On the other hand, if a peak is opposite the finger, the spring member will not be able to drive the finger to the position where the spring closes the contact, and the switch will be open. Leads 222 from each switch and a common lead from the bar conductor 142** may be connected to means which will record the signal.

Although the cam-and-follower viewer adjustment system of the Figs. 1–3 construction can be applied to a visual system, it is preferred in the system described because it lends itself to direct permanent recording. The visual type counter requires observation by a person right at the counter whereas the switch type viewer mechanism produces signals which may be observed remotely from the counter, which may be stored and later observed and/or which may actuate some other mechanism to perform a function that a visual observer might perform after observing the reading on the visual counter. It is contemplated, for instance, that handle 156 may be automatically closed upon stopping the counter so that a fully automatic counting record may be obtained without an attendant should it be desirable to take a series of counts.

Many modifications of the viewer mechanism, calibration means and zero setting arrangement are possible. It is also possible to employ a cam adjusted viewer mechanism in conjunction with the counter's fastest counting shaft. The structure of Fig. 13 illustrates some modifications to the structure of Figs. 1–6. Since the overall principles applicable are the same, only the fastest shaft stage of such a modified structure is shown, other stages thereof bearing a similar relationship to the first stage as corresponding stages in Figs. 1–6 bear to their first or fastest shaft stage.

In Fig. 13 the fastest counting shaft and associated mechanism for a modified counter structure is illustrated in section. The frame, like that of the Figs. 1–6 construction, is composed of parallel plates 250, 252, and 254 etc., joined together by segments of column members 256 and 258. Despite similarity in function and in major structural features certain design differences in the structure of the frame will become apparent. In addition, in connection with Fig. 19, certain other differences in structure will be seen. In this case, for instance, the first counting shaft 260 is not also the counter's drive shaft. The counter's drive shaft is instead shaft 262. Shaft 262 is advantageously mounted for high speed rotation relative to the frame in the ball bearing assembly generally designated 264 which assembly may be of any conventional construction and by which assembly the drive shaft 262 is wholly supported. Shaft 260 is also advantageously ball bearing mounted near its opposite ends in bearing assemblies respectively generally designated 266 and 268. Gears 270 and 272 are mounted on shafts with a 10:1 ratio so that the speed of shaft 260 is one tenth the speed of shaft 262. Shaft 260 is coupled to shaft 274 between plates 252 and 254 by gear connection through gears 276, 278, 280 and 282. A speed reduction of 10:1 is accomplished by gears 276 and 278 from shaft 260 to shaft 284, which gear shaft is mounted in plain journaled bearings in plates 252 and 254. Another 10:1 speed reduction by gears 280 and 282 from shaft 284 to counting shaft 274 causes counting shaft 274 to turn 1/100 revolution for every revolution of counting shaft 260. This second stage of the counter involving the counting shaft 274 is similar to the stage of shaft 260 without the inclusion of the input shaft 262 and the coupling connection thereto. Accordingly, this second counting shaft stage and additional possible stages of the counter are not shown in order to avoid repetition, particularly since their operation is essentially like the corresponding stages in the counter of Fig. 1.

The calibration means in this instance is a drum 286 which is also shown in perspective in Fig. 15. The drum 286 in this instance is shown as a hollow tubular member having one end closed with a planar wall 286a. The wall 286a is equipped with a bushing 288 which supports the wall 286a and the drum on the shaft, but which is not fixed to the shaft. To prevent relative rotational movement between shaft 260 and drum 286, wall 286a is held against frictional surface of disk 290. Disk 290, which is shown separate but which may be cast as part of gear member 272, is fixed relative to the shaft and to said gear 272. Spring 292 extends between bushing 288 and ring 294 which bears against bearing structure 268 or some other member affixed to wall 252. Thus the drum 286 may be moved axially against the pressure of spring 292. The shaft 260 and other counting shafts in this version of the invention have no axial motion.

The drum is disengaged from friction clutch member 290 by exerting axial pressure opposing the spring 292 upon the drum 286. Such axial pressure may be applied from one end of the counter to all of the drum calibration means on each of the counting shafts by means of shaft 296. The axial force on the shaft 296 is transmitted through bevel gear 298 to bevel gear 300 on the drum. Gear 298 is not fixed to shaft 296 but is held in place relative to the shaft by the pressure of spring 302 which bears against gear member 298 at one end and against disk-like stop member 303 which is fixed to the shaft at its other end. Because drum 286 is free to rotate relative to shaft 260 once disengaged from the frictional surface of disk 290, the meshed teeth of gears 298 and 300 may be used to rotate the drum to any desired angular position relative to the frame or relative to a viewer mechanism without regard to the angular position of shaft 260. This movement effectively recalibrates the shafts without disengaging the gears (or other coupling means) between the counting shafts. It is of great advantage to zero-set the shafts by recalibration of this sort. Accurate zero setting may be done by mounting on the end 286a of drum 286 (and on the corresponding ends of drums in other stages) a short dowel or stub 304. This stub is in a position to contact a member 306 which is fixed against rotation relative to the frame but is able to be moved into the path of the stub when the shaft 296 is so moved axially that gears 298 and 300 engage. The stub is positioned so that upon the stub's contact with member 306, the drum 286 will be in zero position relative to the frame. The member to be moved into the path of the stub 306 is, in this instance, a sheet metal member having rolled edges to form tubular supports which accommodate shaft 296 and rod 307. Rod 307 is parallel to shaft 296 and fixed to end plate 250. Said sheet metal member is normally out of the way but is automatically moved into the way of stub 304 in the zero setting process because of its position between disks 303 and 305 which are fixed to shaft 296. Once stub 304 contacts member 306, the drum is no longer free to rotate and further rotation of shaft 296 will produce rotational slipping between it and gear 298. Thus, it is possible to use shaft 296 in recalibrating all of the counting shafts to a zero set position. However, each stage must be similar to the stage involving shaft 260 at least to the extent that once the zero position of any calibration drum is obtained, the gear corresponding to gear 198 is free to stop its rotation while the shaft 296 continues to be rotated. Shaft 296 may thus be rotated until each drum calibration means is in zero set position, and the reading of the counter is accordingly zero.

The zero setting mechanism may be widely varied and entirely different components from those illustrated may be employed. In any zero setting system which involves movement of calibration means, however, corresponding movement of the cams must accompany adjustment of the calibration means. The position of each cam must always bear the same relationship to the position of the calibration means. This may be accomplished by making the cam which rotates at the same speed as a particular calibration means an integral part of said calibration means. This has been done with cam 334 by casting it as part of drum 286 in the structure of Figs. 13 and 15.

Because all of the cams and calibration means in a counter of the present invention must maintain a certain phasing or position relationship with one another, the cam 332 cannot be neglected when all of the other cams and calibration means are being zero set. For this reason cam 332 is gear coupled to drum 286 in such a manner that, even when drum 286 is free to rotate independently of shaft 260, said drum is still coupled to cam 332. This coupling is advantageously accomplished by use of a shaft 329 which is mounted to rotate in ball bearing assembly 329a mounted in end plate 250 of the frame at one end and terminated in bevel gear 331 at its other end. Bevel gear 331 cooperates with bevel gear 300 on drum 286 at all times under the urging of spring 333 upon disk 335 on said shaft 329. Gear 337, which is also mounted on the shaft 329, cooperates in turn with gear 339 which is advantageously permanently affixed to cam 332. Cam 332 and gear 339 are free to rotate relative to shaft 329 and rotate at all times at one tenth the speed of drum 286 due to the gear ratios involved at gears 300 and 331 and at gears 337 and 339, which may be 100:1 and 1:10 respectively. By virtue of its coupling to the drum in this manner cam 332 rotates in the same direction as cam 334, thereby keeping simple the linkage system connecting the cam follower which cooperates with cam 332 and the viewer mechanism cooperating with drum 286.

In order to illustrate another system of coding as well as another method of calibrating a shaft, a decimal system rather than a binary system has been shown. In this version of the decimal system, there are ten columns of holes, corresponding to ten parallel disks, for each digit. Thus, for a two digit number there are twenty columns of holes with twenty cooperating finger members. The ten columns of holes representing units digits are labeled with the small letters *a, b, c, d, e, f, g, h, j, k,* for the numbers 0–9 respectively. The ten columns of tens digits are labeled to correspond to the labeling of the units digits except that the small letter designations are primed in this instance. Since there are ten columns of holes and ten corresponding sensing finger switches for each digit, each number from 0–9 has a separate column and separate switch. In each row, a hole need occur only through the particular angular segment where the number represented by that column and switch is the proper digit. As may be seen in Fig. 15, in the case of representing numbers from zero to 99, each of the numbers representing the tens digits requires only one hole but that hole is ten times as long as a hole representing a units digit. All 10 units digits holes are repeated opposite each tens digit hole so that each column of unit digits consists of 10 equally spaced holes or perforations of short length.

Holes in the drum 286 correspond to valleys on the periphery of the disks of the previously described calibration means except that with the drum the finger sensing mechanism is limited as to how deep it may penetrate the drum only by the construction of the mechanism accompanying the finger. That the general switch action remains unchanged may be seen by reference to Figs. 16*a* and 16*b* which show the open and closed positions of the switch members when the viewing mechanism has been moved into reading position. For purposes of comparison with the disk type structure the pattern of holes in the surface of drum 286′ is modified in Figs. 16*a* and 16*b* from the pattern of Fig. 15 to show a column of holes at equal intervals so that if this is the first column of holes, it corresponds to the first disk of the units digit section of the calibration means. It is possible to use columns of holes in drum structures in patterns corresponding to the binary code previously described. Its effect upon the switch mechanism is the same as the effect of disk A upon the comparable switch mechanism in Figs. 12*a* and 12*b*. However, because holes are used in the calibration means and the sensing finger 308 must correspond to the shape of holes, it is accordingly most convenient in this instance to employ rods 308 of circular cross section as sensing finger members instead of flat strips of the Figs. 1–3 and Figs. 12*a* and 12*b* structures. Instead of parallel plates the viewer mechanism 310 comprises a plurality of tubular housings closed at both ends by parallel walls. These walls support sensing finger 308 which passes through aligned holes at the centers of said walls. A piston member 312 lies within the housing 310, is supported upon the internal cylindrical walls 310*a* of housing 310 and is attached to rod 308. A light spring 314 is employed between piston 312 and front wall 310*c* of the viewer mechanism in order to urge sensing finger 308 away from drum 286′ when said viewer mechanism is not in reading position. The spring member 316 of the switch is made heavier than spring 314 so that when a reading is to be taken and it is brought into position against piston 312, it will urge said piston 312 toward the drum and rod 308 into a hole if one is available. If a hole is available, as is shown in Fig. 16b, the switch including members 316 and 318*a* will remain closed. If no hole is available, as shown in Fig. 16*a*, the switch will open. The pattern of open and closed switches when a reading is taken will indicate the number represented by the counter.

The viewer mechanism in viewing position is represented in Fig. 17 showing its position relative to the drum 286 which is sectioned at the level of the viewer mechanism fingers 308. The viewer mechanism action is the same as that shown in Figs. 16*a* and 16*b* with the drum of Fig. 15. This mechanism 310 is advantageously an elongated bar of dielectric material in which there are a plurality of cylindrical housing cells 310*a*, the axes of which are parallel to one another and lie in a plane within the bar. In this instance there are twenty cylinders within each of which is a piston member 312 which is fixed to and aids in supporting one of the sensing fingers 308. Spring member 314 tends to urge the piston 312 hence the rod 308 away from drum 286. In the position shown, the holes of row *b* of the units digits and row *g* of the tens digits are opposite the viewer so that the number 61 is represented by this position of calibration means with respect to the viewer mechanism. The mechanism 310 is supported in rectangular bracket members 320 and 322 at its opposite ends and the bracket members are in turn supported upon plate members 324 and 326. The plate members are parallel and close spaced to frame plate member 250 and 254 and are affixed thereto by pins 328 which permit sliding of the plates, hence the viewer mechanism, relative to the frame in a direction perpendicular to the plane of the fingers 308. Rod 374 extends between the plates 324 and 326 to which said rod is perpendicular. Rod 374 is in turn attached in a manner similar to rods 166 and 168 in Figs. 1–3 to a lever arm. In this instance, however, the lever arm terminates in a cam follower which follows cam 332, a plan view of which is shown in Fig. 14.

Cam 332 has ten discontinuities between ten spiral surfaces since the speed reduction from shaft 262, on which it is mounted, to shaft 260, with which the viewer mechanism cooperates, is only 10:1. Thus, shaft 262 has made only $\frac{1}{10}$ of a revolution, instead of a whole revolution, when the change-over from one number to another on the calibration means 286 takes place. Said change-over takes place every $\frac{1}{100}$ revolution of shaft 260 since calibration means 286 represents 100 numbers. Thus, it may be seen that no matter what the speed of a rotating shaft, a cam may be employed on it for following the action of the viewer mechanism employed with a slower shaft. It is even possible to use a cam on the same shaft as that observed by the viewer, but, among other difficulties to be encountered as a result of this technique, only one hundredth of a revolution will take place between cam shoulders or discontinuities, thereby leaving wide opportunity for error. In zero setting the calibrated drum, the function of cam 332 must be to maintain such a position that its cam follower will be at the bottom of any one of its shoulders.

Cam member 334 cooperates with the cam follower attached to that viewer mechanism which cooperates, in turn, with the calibration means on shaft 274. This cam follower and its coupling to the viewer mechanism may be essentially the same as that employed in Fig. 1 with the third shaft 40. In other words, the action of the cam follower in positioning the viewer mechanism cooperating with shaft 274 is referred back to the cam follower which cooperates with cam 332 for greater accuracy at points of "in unison" change-over readings. This same action is again applied to the viewer mechanism cooperating with the third counting shaft, etc.

A modified form of the present invention provides a counter which may be pre-set to count to any pre-selected number and then to produce a signal or act to stop equipment. Such a pre-settable counter is valuable in applications calling for an extract number of repetitive operations.

The operation of the pre-settable counter of the present invention is in most respects essentially the same as the operation of the counter hereinbefore described. Rather than being set to zero, however, such a pre-settable counter's preliminary setting involves first an affirmative act of selection of a number, and then movement of the various calibration means until they are in the proper relative positions to represent the pre-selected number. Pre-setting involves the movement of all of the calibration means until they are restricted against further movement by means prepared to act in response to conditions initiated by the specific acts of pre-selection of the pre-set count. Finally the counter may be run backwards from the pre-set position to zero position. It should be noted that the counter may, in the alternative, be set at its complement (the capacity of the counter minus the desired number) and then run forward to zero, in counting.

In the pre-settable counter, the viewer mechanism is employed to pre-set the calibration means, rather than merely "viewing" in the sense of taking a count when desirable. Since there is but one proper position of each of the calibration means relative to the frame for any one pre-selected number, the function of the viewer mechanism in the pre-settable counter becomes that of stopping the calibration means in that one position (i. e., the position representing the number or its complement). In order to stop a calibration means, it is most convenient to employ finger members similar to those employed with the viewer mechanisms together with peak and valley type of calibration means of the Fig. 1 and the Fig. 13 types of counter. If such an arrangement is employed, however, the nature of the finger actuation of the viewer mechanism must be changed to be useful in the pre-settable application. More specifically, only the fingers which would be in the valleys at the pre-selected number may be urged toward the calibration means, and usually these may not be simultaneously urged toward the calibration means, as will be explained hereafter. The selected fingers must be urged toward the calibration means while said calibration means is being rotated, instead of only when the counter is stopped, in order for the proper number to be selected by virtue of the limitation on its movement imposed upon it when a finger enters a valley. Actually the viewer mechanism then acts more as a referencing device, just as the zero setting means does in the previously described counters, except that it is a more versatile referencing device than the zero setting means. The means recording the count in the pre-settable counter does so only when the counter reaches zero position; hence, the recording mechanism can be much simpler than the previously described viewer mechanisms.

Pre-setting is facilitated by the use of a counter of the type shown in Fig. 13. With such a counter there are ten separate switches for every digit representing every possible number. Only one of the ten switches for each digit may be actuated or urged toward the calibration means. If only the switches representing the particular number desired for each of the digits are successively urged to close in proper sequence while rotating the calibration means, the proper number will be selected as described hereafter. Selection will occur as drum calibration means 286 is rotated, in a manner similar to the zero setting process previously described, because only the proper sensing fingers are urged to enter holes in the drum calibration means 286. The zero setting stub 304 and stop 306 are preferably omitted, since they are not necessary and may interfere with the selection process. The tens digit is selected first and thereafter the units digit is selected. When the sensing fingers representing the units digits have entered holes, the drum 286 is held by the fingers against further motion because the units digits valley or hole calibrations are just wide enough to accommodate a sensing finger which finger then restricts movement by bearing against the valley sidewalls. The structure of Fig. 13 is advantageous inasmuch as it permits quick positioning of the calibration means using shaft 296 which will slip relative to the gear connection to a calibration means, the correct preset position of which has been selected.

Just as the viewer mechanism as a whole is no longer a recording member but a referencing member, so also the rod-like spring members no longer need provide one of a pair of count reading switch contacts but merely need provide a means of urging forward the associated sensing finger. However, the rod-like spring members do advantageously provide a relay switch contact, as may be seen by the "viewer mechanism" arrangement for use with a pre-settable counter illustrated in Figs. 18*a*, 18*b*, and 18*c*. As in the previously described switch structures, the spring-like members 350 are mounted on a rotatable base portion 352. Each spring is equipped with a solenoid 356 which may be energized by connection of winding 358 to an energy source. The solenoids for the various springs may be mounted on base member 352. The other contact 360 of the relay switch advantageously lies on the other side of the sensing fingers from the mounting 352. When moved by rotation of base member 352 into proper position for urging the fingers toward the calibration means, which movement is advantageously accomplished by the same means which first brings the viewer mechanism into reading position, the springs appear as in Fig. 18*a*. When a particular finger representing the selected number is selected, a current is passed through its winding 358 which causes spring 350 to be attracted to solenoid 356 as is shown in Fig. 18*b*. Spring 350 presses against piston 362 which is supported on the cylindrical walls 354*a* of one of the cells in the viewer mechanism 354. This movement tends to drive sensing finger 364 against the drum in opposition to light spring member 366 as in Fig. 18*b*. When the sensing finger 364 finds a hole in the drum, finger 364 and piston 362 move forward and spring 350 is able to contact contact member 360, thus closing the relay switch, much as the switch in Fig. 18*c* is closed.

It will be apparent that it is essential that the tens digit be set before the units digit using the calibration means of Fig. 13. There is only one hole or slot for each tens digit, but it is a slot which permits limited rotation of the drum to locate the proper units digit within the overall range of the tens digit slot. There are ten holes for each units digit corresponding to each of the ten possible numbers which may represent the tens digit. Once the units digit is selected, there can be no further rotational movement. Thus, it may be seen that initial location of a units digit would preclude subsequent movement in order to locate the tens digit. This selection process must be repeated for each of the viewer mechanisms cooperating with its respective calibration means. Again, that digit representing the greatest number of units on any calibration means will have only one slot for each number 0–9 to represent the digit and hence should be selected first. Other digits should be chosen in decreasing order of the number of units they represent which order is also the order of decreasing size of the holes.

It is, of course, possible to employ a system other than the decimal system for calibrating a pre-settable counter but the decimal system is the preferred and the most straightforward system for this use. Another system employing a similar type of selecting involves selection of a relatively large bracket of values by the first movement, with successively smaller values selected by subsequent movements until the ultimate number brackets include but one number. Such a system usually requires both forward and backward movement of the calibration means to finally arrive at the selected position, whereas the system illustrated and described requires rotation in only one direction if the pre-setting process is initiated from the zero position of the counter.

In the preferred pre-set version of the invention, the cam action for adjusting the position of the viewer mechanisms relative to the calibration means with which they cooperate is still necessary. For accuracy, it is necessary that the exact position be assumed by the calibration means relative to the frame and relative to their viewer mechanisms so that, when the counter is pre-set, the viewer mechanisms are in the positions they occupy when said number has been counted out. It is the position of the calibration means and the cam on the faster shaft which is determinative of the position of the viewer mechanism relative to calibration means on the slower shaft. Accordingly, it is necessary in pre-setting to first pre-set the calibration means and the cam on the fastest shaft to their correct positions and then pre-set the calibration means and cams in the order of decreasing speeds of the shafts on which they are mounted.

The frame and mounting structure employed with the modified counter structure of Fig. 13 may also be employed with the preset counter with but minor modifications. Fig. 19 shows schematically in perspective a frame for a counter employing the general mechanism components illustrated in Figs. 13–17. Only a portion of those counting shafts which carry the cams is shown, and neither the calibration means nor the gear coupling between the counting shafts is shown. It is to be understood, of course, that all the calibration means must be aligned with all the cams, as previously alluded to, before accurate operation of the counter is possible. The viewer mechanisms are schematically represented by rectangular blocks, and sensing fingers, switches and switch actuation means are not illustrated at all because their location and operation relative to the viewer mechanisms have been fully explained.

The basic frame structure in this instance consists of four parallel plate members 250, 254, 370 and 371. These plates are of generally square cross-section but areas of plates 254 and 370 are cut away. Rigidly connecting these plates together are two segmented columns 256 and 258. The input drive shaft 262 is mounted on plate 250. Counting shaft 260 is mounted between end plate 250 and a plate 252 (see Fig. 13) which is not shown in Fig. 19. Plate 252 is narrower than plates 250 and 254 in order to avoid interference with viewer mechanism 310''. Drive shaft 262 is gear connected to counting shaft 260 adjacent plate 250 and counting shaft 260 is, in turn, gear connected to counting shaft 274 (see Fig. 13) between plates 252 and 254. Counting shaft 274 is mounted to extend between plate 254 and a narrow plate, similar to plate 252, between plates 254 and 370, and, finally, shaft 274 is gear connected to the slowest counting shaft (not shown) which is mounted to extend between plates 370 and 371.

Viewer mechanisms schematically represented by boxes 310'', 372 and 373 are slidably mounted between plates 250 and 254, plates 254 and 370, and plates 370 and 371, respectively. Viewer mechanism 310'' is directly supported at its opposite ends by members 324' and 326' which are slidably mounted on plates 254 and 250 respectively by pin means 328. The members are also connected by rod 374. Viewer mechanism 372 is directly supported at its opposite ends by members corresponding to plate members 324 and 326, one of which is member 375. These plate members are also connected together by rod 376. Viewer mechanism 373 is similarly directly supported at its opposite ends by plate members, one of which is plate 377, which are also connected together by rod 378.

Rod 374 is also fixed perpendicular to parallel lever arms 379 and 380. At their ends, these lever arms are, in turn, connected to axle 381. Axle 381 is then rotatably fixed to the frame. Lever arm 379 extends beyond rod 374 and terminates in cam follower 379a which cooperates with cam 332 which is mounted on drive shaft 262. Also connected to rod 374 by means of spring 382 is lever 383 which is, in turn, rotatably connected to pivoted plate 384. Handle 385, when pressed inward, depresses the edge of plate 384 which is attached to lever 383. Lever 383 then exerts a pull on rod 374 which brings cam follower 379a to bear on cam 332 and thus determines the position of viewer mechanism 310'' with respect to the calibration means on shaft 260.

Rod 376 is similarly fixed perpindicular to parallel lever arms 386 and 387. At their ends these lever arms are, in turn, connected to axle 388. Axle 388 is not fixed to the frame but is rather rotatably fixed to one end of each of two lever arms 389 and 390 which are terminated at their other end in axle 391. Axle 391 is rotatably mounted on the frame. A pin 392 mounted on lever arm 390 extends parallel to axles 388 and 391 across to extension 380a, which effectively provides a short lever arm at right angles to lever arm 380 and rigidly fixed thereto. The position of extension 380a determines the horizontal position of axle 388 by determining the position of lever 390. Lever arm 386 extends beyond rod 376 and terminates in cam follower 386a which cooperates with cam 334. Also connected to rod 376 by means of spring 393 is lever 394 which is, in turn, rotatably connected to pivoted plate 395. Handle 396, when pressed inward, depresses the edge of plate 395, which is attached to lever 394. Lever 394 then exerts a pull on rod 376 which brings cam follower 386a to bear on cam 334' in a position influenced somewhat by cam 332 due to the interconnection of linkage systems at pin 392. Thus, the position of the viewer mechanism 372 is determined with respect to the calibration means on shaft 274.

Rod 378 is also fixed perpendicular to parallel lever arms 379 and 398. At their ends, these lever arms are, in turn, connected to axle 399. Axle 399 is not fixed to the frame but is rotatably fixed to one end of each of two lever arms 400 and 401 which are terminated at their other end in axle 402. Axle 402 is rotatably mounted on frame members. A pin 403 on lever arm 400 extends parallel to axles 388 and 391 across to extension 387a of lever arm 387, which extension lies outside lever arm 389 and which provides a short lever arm at right angles to lever arm 380 and rigidly fixed thereto. The position of extension 387a determines the horizontal position of axis 399 by determining the position of lever 400. Lever arm 397 extends beyond rod 378 and terminates in cam follower 397a which cooperates with cam 404. Also connected to rod 378 by means of spring 405 is lever 406 which is, in turn, rotatably connected to pivoted plate 407. Handle 508, when pressed inward, depresses the edge of plate 407 which is attached to lever 406. Lever 406 then exerts a pull on rod 378 which brings cam follower 397a to bear on cam 404 in a position influenced somewhat by cam 334' due to the interconnection linkage system at pin 403. Thus, the position of viewer mechanism 372 is determined with respect to the calibration means with which it cooperates.

If the structure of Fig. 19 is employed with a counter designed to perform in essentially the same manner as the counter of Figs. 1–6 does, the handles 385 and 396 may be eliminated and plates 384, 395 and 407 connected together to be operated in unison by movement of handle 408. In this event, handle 408 would not be closed unless the counter were stopped. Upon stopping, movement of handle 408 would first cause all of the cam followers to contact their cams, and then, after the viewer mechanisms had been thus properly positioned, the sensing fingers would be caused to contact the drum calibration means.

The frame of Fig. 19 as illustrated, however, is arranged for use as a pre-set counter which entails little more than changing the switches employed with the viewer mechanisms from the structure of Fig. 16a. In presetting the calibration means on the fastest shaft, handle 385 is first depressed prior to rotation of the calibration means 286. Thus, the cam follower 379a is brought to bear on cam 332 and remains there during rotation of the calibration means. Thus the cam 332 influences and makes accurate selection of the proper position for the calibration means as found by the urged fingers of viewer mechanism 310'. Handle 396 is next depressed while handle 385 is held depressed, so that cam follower 386a is brought to bear on cam 334' and remains there during rotation of the calibration means. Thus, viewer mechanism 372 must be in its proper position at the time of the selection of its digits. Finally, handle 408 is depressed, while handles 396 and 385 are both held depressed, so that cam follower 397a is brought to bear on cam 404 and remains there during rotation of the calibration means. Thus, viewer mechanism 373 must be in its proper position when its pre-selected digits are chosen.

Just as the sequence of positioning of the viewer mechanisms relative to their calibration means must be controlled, so, also, must there be control of the sequence of digit selection in pre-setting a counter. Fig. 20 shows a relay circuit for controlling the sequence of the digit selections. Although only eight of the ten solenoids and cooperating switches for each digit are shown, it is to be understood that ten such combinations of elements are required for each dgit for use in the pre-settable counter previously described. The solenoids and switches in the group marked "I" are those influencing the setting of the fastest shaft, such as shaft 260 in Fig. 19. Those in the group marked "II" are the solenoids and switches influencing the setting of the next fastest shaft, such as shaft 274 in Fig. 19. Those in the group marked "III" are the solenoids and switches influencing the setting of the slowest of the three shafts. The letters "a" to "h" represent finger-switch assemblies indicating numbers 0–7, and the primed letters represent the corresponding assemblies indicating the larger of the two digits indicated by the calibration means on each shaft. Thus, in section I, the primed letters represent the switches indicating the tens digit; the unprimed, the switches indicating the hundreds digit. In section II the primed letters represent switches indicating the thousands digit; the unprimed, the switches indicating the hundreds digit. In section III the primed letters represent the switches indicating the hundred thousands digit; the unprimed, the switches indicating the ten thousands digit. The pre-setting is pre-selected by closing a selection switch, corresponding to switch 367, in series with a solenoid winding and an energy source for each digit. Each selection switch is in series with a solenoid winding corresponding to winding 358 and an energy source. In other words, the switches in series with the solenoid winding, like switch 357, are used to determine the number selected for each digit. The six digits are selected by closing six selection switches, each in series with a different solenoid. Once the selection of the number has been made in this manner, switch 412 may be closed. This closing of switch 412 is advantageously done by, and simultaneously with, the closing of handle 385. Thereafter, the potential from battery 414 will cause a flow of current through the solenoid of the tens digit number earlier selected by closing its selection switch. The solenoid will, in turn, exert a pull on its associated spring member, corresponding to member 350. When under this urging of the spring its associated sensing finger finds its hole in the calibration means, the relay switch, corresponding to switch 361, will be closed, thereby enabling a flow of current from battery 416 to the solenoid winding in series with the selection switch closed in selecting a number for the units digit. As the calibration means is rotated, the units digit finger will find its hole therein and permit the closing of its relay switch. The closing of said relay switch should permit energizing of the solenoid corresponding to the selected thousands digit. However, in going from section I to section II, the switches employed with the fastest shaft and next fastest shaft, respectively, it is well to supply a switch 418 which is not closed until the closing of lever 392. Once switch 418 is closed, and the viewer means in position, the thousands digit solenoid previously selected will be energized, thereby urging its associated sensing finger toward the viewer mechanism. Upon this finger's finding its hole, the thousands digit relay switch will close. The selected hundreds solenoid will then be energized by battery 422 and act to urge inward its corresponding sensing finger. When this sensing finger finds its hole and closes its associated relay switch, battery 326 will not be able to energize the solenoid corresponding to the selected hundred thousands digit because switch 424 is open. However, as the handle 408 is closed, switch 424 is closed, thereby permitting continuation of the pre-setting process. The battery 326 then energizes the proper pre-selected hundred thousands digit solenoid, and, when its corresponding sensing finger finds its hole and permits its relay switch to close, the pre-selected ten thousands digit solenoid will be energized, thus urging the last finger into its proper hole and thereby finally positioning the calibration means. If a drive motor 430 is employed to cause rotation of shaft 296, when the final finger enters its proper hole, it may close a relay switch to permit a solenoid 432 to be energized by battery 434. Energized solenoid 432 will open switch 436, thereby stopping drive motor 430.

Figs. 21a and 21b show a photo-electric zero-position indicator such as may be employed with a pre-set counter. This photo-electric zero-position indicator depends upon alignment of holes in members mounted on the counter shafts 370', 372' and 374' with holes in frame members. For instance, disks 432, 434 and 436 which are mounted on shafts 370', 372' and 374', respectively, are each provided with a small hole 432a, 434a, 436a, respectively, at a common radius, assuming the shafts to be located along the same axis. Frame members schematically represented by plates 438 and 440 must also be provided with small holes 438a and 440a, respectively, with which the holes in the disks are aligned when the shafts are in zero position. Of course, the disks are schematic, and members of the structure mounted on a shaft for another purpose may be provided with holes which serve the same function, provided that the members are elsewhere imperforate at the radius of the hole. Only when the holes 432a, 434a, 436a, 438a and 440a are aligned is the zero position indicated. Only when the holes are aligned is a light beam from light source 442, which is supplied energy by battery 444, able to pass through the aligned holes to photo-electric tube 446. Battery 447 will cause a current to flow in photo tube 446 when said tube is irradiated by a beam from light 442. Solenoid 448 will then be energized and act to open switch 450 in the circuit of motor 452, which may be the motor driving the machinery coupled to the counter.

A different scheme for opening the switch 450' in the circuit of motor 452' is shown in Fig. 22 in which metal shafts 370'', 372'' and 374'' each carry a pair of disks. One disk 462, 464 and 466 of each pair is non-conductive except for a small segment of its periphery 462a, 464a and 466a, respectively, which segments are conductively connected to the metal shaft. Brushes ride on the periphery of each disk. The brushes riding on disks 458 and 466 are connected together by lead 468. The brushes riding on disks 456 and 464 are connected together by lead 470. And the brushes riding on disks 460 and 462 are connected together by lead 472 through battery 473 and solenoid 474. The solenoid 474 actuates the switch 450' to open said switch and stop the motor when the circuit is completed through the various pairs of disks, when all three conductive segments in disks 462, 464 and 466 contact their brushes at the same time. The position of the shafts relative to the frame at which this occurs may be the zero position by proper location of the conductive segments 462a, 464a and 466a.

Fig. 23 illustrates an arrangement, alternative to that of Fig. 6, for use with counters which employ discrete stopping points and a fixed viewer mechanism in cooperation with the fastest counting shaft. A disk member 476 with teeth 476a in its edge is mounted on the fastest counting shaft 480. A magnet 478 having a pair of pole faces, each of which has teeth 478a thereon, is arranged with its teeth parallel to the teeth on disk 476. The shape of the poles conforms to the shape of wheel-like disk 476 so that the teeth 476a on the disk and teeth 478a on the magnet are close spaced. If the magnet is fixed relative to the frame, the disk will tend to come to rest so that teeth 476a are directly opposite teeth 478a because such a position offers a flux path of lower magnetic reluctance than other positions. Use of an appropriate number of teeth, together with proper arrangement of the teeth relative to the shaft, will limit the stopping point of the shaft to a selected number of discrete positions. The magnet 478 may be either a permanent magnet or an electro-magnet.

It will be apparent from the foregoing descriptions that a counter of the present invention may employ any number of counting shafts. Counters employing three shafts, each of which has one hundred positions, are widely useful because of their ability to count to 1,000,000 units. In some applications, however, even single shaft counters have sufficient capacity to be useful. A version of the present invention employing only two counting shafts 500 and 502 is shown in Fig. 24. These shafts are advantageously coupled together to rotate in opposite directions and to give a ratio of speed of 100:1 with shaft 502 being the faster. Although it is not shown, it is advantageous to supply disk 504 at its outer periphery with teeth which mesh with teeth on shaft 502 to give the desired speed ratio. Near one edge, the planar surface of disk calibration means 504 and 506 are numbered from 00 to 99. This numbering on disk 504 is arranged in a circular pattern, with the top of each number adjacent the edge of the disk. The numbering on disk 506, on the other hand, is arranged in a spiral with the right side of the units digit always nearest the edge of the disk. Disk 506 is placed in front of disk 504 and partially overlaps disk 504. A spiral window 508 is provided through disk 506 immediately adjacent and inside the numbering thereon. The disks are arranged so that the numbers on disk 504 may be seen through window 508 and read as the thousands and hundreds digits of a four digit number. Since the slower shaft moves one hundredth of a revolution in one revolution of the faster shaft, the radius of the spiral window is shortened (or lengthened depending on the direction of the operation) the distance of linear movement of the number on disk 504 in 1/100 revolution. Since the numbers in this instance are visually read, the viewer in this instance is a rectangular window 510 in cover 512 which advantageously corresponds to the frame of previously described counters, relative to which frame the shafts move. This window 510 is arranged along that radius of disk 506 along which the numbers on disk 504 may be seen through cam-like window 508. The window is long enough to accommodate six digits in order to permit the effective two digit shift which occurs by virtue of the apparent movement of both cam-like window 508 and the calibrations on disk 506. Although window 510 is not made movable in this case, it is possible to insure that the number calibrations on disk 506 will always be squarely opposite said window by use of a sort of ratchet interconnection between its shaft and the housing which permits stopping of disk 506 only in those positions where its calibrations are squarely opposite window 510.

Many modifications of the present invention within the scope of the claims will occur to those skilled in the art. For instance, the calibration means may be varied as to code, as to structural form and as to its action in cooperation with the viewer mechanism. Many codes other than binary and decimal codes are possible and may be used to advantage under various conditions. A different number of units may be employed in calibrating counting shafts. It is usually preferable to calibrate each shaft with a number of units numbering some multiple of ten, preferably 100, because of the relative ease of decoding the readings of such a counter, but the invention is not limited to counters calibrated in this manner. It is even possible to use different numbers of units in calibrating the various shafts in a counter of the present invention, but, in each instance, the number of units of the slower shaft must be either the number of times the speed is reduced (ratio of speed reduction with respect to one) or some even multiple or quotient thereof in order for the cam action to be effective. The structural form of all calibration means described by the claims is intended to be within the scope of this invention. The action of the calibration means is dependent upon how the reading is to be taken, e. g., by sight, by electrical signal, etc. Various modifications of viewer mechanisms for reading the counter are intended to be within the scope of this invention.

This invention is not limited to any type of power input method. Various types of ratchet couplings, as well as all sorts of direct couplings, may be employed with the present invention. For instance, it is possible to employ a ratchet input coupling with preferred forms of the present invention for the purpose of recording counts occurring in pulses rather than at uniformly spaced intervals. Such a ratchet device may be operated with low power due to the lightness and frictionless smoothness possible with the present counter. When using a ratchet input, it is possible to keep the cam followers in reading position and have them interconnected with the ratchet system so that the followers will be lifted during operation of the ratchet.

In general, it may be said that this invention applies to structures employing camming action to cause a viewer mechanism to follow a calibration on a calibration means in accordance with the following claims.

I claim:

1. A pre-settable counter comprising a shaft rotatably mounted relative to a frame, calibration means on the shaft calibrated to represent $n$ different numbers, said calibration means providing a plurality of annular patterns, each pattern consisting of peak and valley areas, the annular patterns being arrangeable into groups such that a valley is provided at every calibration point by one of the patterns of the group and such that a first group is composed of annular patterns each of which has only one elongated valley and annular patterns in subsequent groups may have a plurality of valleys but not more than one valley per pattern within the limits of any valley of a previous group, the final group having valleys of a length which relatively snugly accommodate a sensing finger, said valleys being centered at the $n$ calibration points, a viewer mechanism comprising groups of sensing fingers corresponding to the groups of annular patterns and arranged to oppose said annular patterns, actuation means for each finger for urging its associated finger toward the calibration means such that when a finger enters a valley area which is so bounded by peak areas that said sensing finger limits the angle of rotation permitted by the length of the valley portion containing the finger, selection switches for energizing the actuation means and zero indicating means which indicates when the calibration means is in zero position relative to the frame.

2. A structure in accordance with claim 1 in which the viewer mechanism is movable over $1/n$ revolution, $n$ being the number of calibrations, means causing the viewer mechanism to be positioned squarely opposite a given calibration over $1/n$ revolution of the shaft, said means including a cam coupled to the shaft to move at a rate proportional to the speed of rotation of said shaft.

3. A pre-settable counter having a plurality of counting shafts, calibration means and viewer mechanisms as described in claim 1 each of which viewer mechanisms is movable relative to the frame, means causing said mechanisms to move in such a way as to follow the movement of the calibration means over a $1/r$ revolution where $r$ is the ratio with respect to one of speed reduction from the counting shaft next faster than the one on which the calibration means viewed by the viewer mechanism is mounted, means acting upon all viewer mechanisms, except that one which cooperates with the fastest shaft, causing said mechanisms to follow the movement of the calibration means with which they cooperate, said means including a cam on the counting shaft next faster than the counting shaft on which is mounted the calibration means with which said viewer mechanism cooperates.

4. In combination with a plurality of counting shafts rotatably mounted relative to a frame and coupled together to rotate at different speeds, calibration means on each of the shafts, the calibrations on each of which calibration means are spaced apart equal angles of rotation, viewer mechanisms mounted relative to the frame to cooperate with the calibration means, those viewer mechanisms cooperating with the calibration means on counting shafts slower than the fastest counting shaft being able to move relative to the frame and maintain cooperation with any given calibration at least over the angle of rotation separating calibrations, cam means mounted on each of the counting shafts except the slowest, and means cooperating with said cam means and coupled to the viewer mechanism cooperating with the next slower shaft to cause said viewer mechanism to be positioned squarely opposite the proper calibration on the calibration means of said slower shaft over the angle of rotation between calibrations on said slower shaft.

5. In combination with a pair of counting shafts rotatably mounted relative to a frame and coupled together to rotate at different speeds, calibration means on each of the shafts, the calibrations on each of which calibration means are spaced apart equal angles of rotation, a cam mounted on the faster shaft and another faster cam mounted to rotate relative to the frame faster than the faster shaft, viewer mechanisms mounted relative to the frame to cooperate with the calibration means and able to move relative to the frame to maintain cooperation with any given calibration on its calibration means at least over an angle equal to that separating calibrations on the calibration means with which said viewer mechanism cooperates, cam followers cooperating with said cams, each of which followers is coupled to the viewer mechanism cooperating with the shaft next slower than the cam, a movable mounting for the cam follower which cooperates with the slower cam, said mounting being coupled to the cam follower cooperating with the faster cam in such a manner that the cam follower which said mounting mounts will remain opposite the same point of the slower cam's surface over an angle of rotation of the faster shaft equal to the angle of rotation between calibrations on said shaft.

6. In combination with a plurality of counting shafts rotatably mounted relative to a frame and coupled together to rotate at different speeds, calibration means on each of the shafts, the calibration on any given calibration means being spaced apart equal angles of rotation, viewer mechanisms mounted relative to the frame to cooperate with the calibration means, those viewer mechanisms cooperating with the calibration means on counting shafts slower than the fastest counting shaft being able to move relative to the frame and maintain cooperation with any given calibration, at least over that angle of rotation separating calibrations on the calibration means with which it cooperates, cam means mounted on each of the counting shafts except the slowest, means including cam followers cooperating with said cam means and coupled to the viewer mechanisms to be positioned squarely opposite a given calibration on the calibration means of each of said slower shafts over the angle of rotation between the calibrations, mounting means for cam followers other than the cam follower cooperating with the fastest moving cam, which mounting means permit movement of said followers in such a manner that each of said followers may remain opposite the same point on the cam surface at least over that angle of rotation separating calibrations on the calibration means on the shaft on which said cam is mounted and means coupling said mountings for said cam followers and the cam followers cooperating in each instance with the next faster cam in such a manner that said mounting will cause the mounted cam follower to cooperate with the same point on its cam over the angle of rotation between calibrations on the shaft mounting said cam.

7. A pre-settable counter comprising a frame, a counting shaft rotatably mounted relative to the frame, calibration means on said shaft, a viewer mechanism mounted on the frame opposite the calibration means and having sensing fingers which are able to contact the calibration means, means by which individual sensing fingers may be urged toward the calibration means, actuation means for pre-selecting fingers to be urged toward the calibration means, drive means mounted relative to the frame for rotating the calibration means in order to permit the pre-selected sensing fingers to engage the calibration means and limit its movement, control means for controlling the sequence of urging the fingers toward the calibration means so that the widest range of rotational limitation will occur first and subsequent narrower ranges of rotational limitations will occur from the widest range to no range at all and signal means on the calibration means cooperating to signal zero position of the counter.

8. A pre-settable counter comprising a frame, a counting shaft rotatably mounted relative to the frame, calibration means on said shaft, a viewer mechanism mounted on the frame opposite the calibration means and having sensing fingers which are able to contact the calibration means, spring means mounted on the frame solenoids positioned on the frame to act upon the spring means to cause said springs to urge the fingers toward the calibration means, circuit elements in the circuits with the solenoids for pre-selecting which solenoids will act upon said springs, drive means mounted relative to the frame for rotating the calibration means in order to permit the pre-selected sensing fingers to engage the calibration means and limit its movement, interconnecting relay means, solenoid circuits for controlling the sequence of operation of the solenoids so that the widest ranges of rotational limitation will occur first and subsequent narrower ranges of rotational limitation will occur from the widest range to no range at all, and signal means on the calibration means cooperating to signal the zero position of the counter.

9. A counter having a counting shaft rotatably mounted on a frame and a calibration means on the shaft calibrated to represent $n$ different numbers with the calibrations $1/n$ revolution apart on their centers, wherein a viewer mechanism moves relative to the frame so that it is capable of cooperation with the calibration means over $1/n$ revolution of said calibration means and wherein said viewer mechanism is moved into a reading position squarely opposite a given calibration by means cooperating with a cam which is coupled to the shaft to rotate at a speed faster than the counting shaft but proportional to its rate of rotation and which is shaped to produce a repetition in the reading position of the viewer mechanism every $1/n$ revolution of the shaft.

10. The counter of claim 9 in which the counting shaft bearing the calibration means is the slower of a pair of counting shafts which are coupled together so that one rotates $n$ times faster than the other and in which the faster shaft bears the cam which is capable of producing a repetition in the reading positions of the viewer mechanism every revolution of the faster shaft.

11. The counter of claim 9 in which the means cooperating with the cam is a cam follower on a lever rotatably mounted on the frame, rigid connection being provided between the viewer mechanism and the lever, an actuator is movable relative to the frame and has a first spring connected to the lever and a stop arranged to move with the actuator to limit the movement of the lever toward the actuator, and a second spring is arranged between the actuator and the frame to urge the actuator into a position where it will hold the cam follower away from the cam.

12. A counter having a plurality of counting shafts each of which bears calibration means and is associated with a viewer mechanism in accordance with claim 9 in which the shafts are coupled together to rotate at different speeds and each of the shafts except the slowest bears a cam which is coupled to the viewer mechanism associated with the calibration means on the next slower shaft so that the cam produces a repetition in the reading position of the viewer mechanism every revolution of the faster shaft.

13. The counter of claim 12 in which the speeds of the various shafts are such that each of the calibration means has $r$ calibrations where $r$ is the ratio of the speed of the next faster shaft to the speed of its shaft and each cam has one discontinuity.

14. The counter of claim 12 in which a movable viewer mechanism cooperating with calibrations on the fastest counting shaft is coupled to a cam arranged to rotate at a speed faster than said fastest counting shaft.

15. The counter as claimed in claim 12 in which only the viewer mechanism cooperating with the fastest counting shaft is fixed relative to the frame and in which means on the frame and cooperating means on the fastest shaft coact to stop the calibration means only at those discrete positions where calibrations are squarely opposite said fixed viewer mechanism.

16. The counter of claim 12 in which the coupling to the fastest cam consists of a cam follower supported on a lever which is connected to the viewer mechanism cooperating with the calibration means of the next fastest shaft and which is rotatably mounted on the frame and the coupling in other cases consists of a cam follower supported on a first lever which in each case is connected to the viewer mechanism cooperating with the calibration means of the shaft next slower than that mounting the cam and which is rotatably mounted on a second lever which is in turn rotatably supported on the frame and which second lever is coupled to the cam follower of the cam next faster than the cam which acts upon the first lever to which it rotatably mounts in such a manner that movement of the cam follower of said next faster cam over a discontinuity in its cam shifts the second arm and hence the first lever and the cam follower it supports next slower cam to a position which will assure its movement over a discontinuity of said slower cam if the follower on the slower cam is within $1/n$ revolution from the discontinuity of said slower cam.

17. The counter of claim 12 in which the viewer mechanism cooperating with the fastest counting shaft is fixed relative to the frame, and means on the frame and cooperating means on the fastest shaft permits stopping of the calibration means at only those discrete positions where calibrations are squarely opposite said fixed viewer mechanism.

18. The structure of claim 12 which has fixed relative to the frame the viewer mechanism cooperating with the fastest counting shaft, a disk-like member mounted on said shaft, said disk having $n$ grooves $1/n$ revolution apart, where $n$ is the number of calibrations on said fastest shaft, and a lever arm mounted on the frame so that its free end is terminated in a portion accepted by the grooves when the calibration means is in a position such that a calibration is squarely opposite said fixed viewer mechanism.

19. The counter of claim 12 in which each of the means cooperating with the cam is a cam follower on a lever rotatably mounted on the frame, rigid connection being provided between its associated viewer mechanism and the lever, an actuator is movable relative to the frame and has a first spring connected to each lever and a stop for each lever arranged to move with the actuator to limit the movement of the lever toward the actuator, and a second spring is arranged between the actuator and the frame to urge the actuator into a position where it will hold the cam followers away from their cams.

20. In combination with a counting shaft rotatably mounted relative to a frame, calibration means on the shaft which calibration means provides peak and valley areas arranged in annular patterns concentric with the shaft, a viewer mechanism mounted on the frame including a plurality of sensing fingers slidably mounted on and guided by the frame to move in a generally radial direction toward the calibration means, flexible spring conductors in position to urge the sensing fingers toward the calibration means, a support rotatable relative to the frame for supporting the spring conductors, and at least one contact for each spring member supported relative to the rotatable support, insulated from the spring, and positioned so that when its associated finger is urged toward the calibration means by rotation of the spring supporting rotatable support in one of the two possible positions of the finger opposite a peak or valley portion, the contact will be completed.

21. The counter of claim 9 in which the viewer mechanism is mounted on the frame, said viewer mechanism has a plurality of sensing fingers capable of being moved alternatively in a generally radial direction against the calibration means on the shaft or away from the calibration means, the calibration means providing peak and valley areas arranged in rotatable annular patterns opposite the sensing fingers, and means is provided to indicate, when the finger members are urged toward the calibration means, whether they are opposed by peaks or relatively unopposed.

22. The counter of claim 12 in which the viewer mechanism is mounted on the frame, said viewer mechanism has a plurality of sensing fingers capable of being moved alternatively in a generally radial direction against the calibration means on the shaft or away from the calibration means, the calibration means providing peak and valley areas arranged in rotatable annular patterns opposite the sensing fingers and means is provided to indicate, when the finger members are urged toward the calibration means, whether they are opposed by peaks or relatively unopposed.

23. The structure of claim 22 in which the means urging the fingers toward the calibration means are rod-like spring members each of which provides one switch contact, the other contact of which is arranged to be contacted by the spring-like contact in one position of its associated sensing finger and not contacted in the other position of its associated finger.

24. The structure of claim 22 in which the calibration means is a cylinder in the cylindrical surface of which are a plurality of annular patterns of holes having various lengths, said patterns being arranged so that one pattern opposes each of the sensing fingers, the cylindrical surface providing the peaks opposing the urging of the fingers and the holes providing the valleys which do not oppose the urging of the fingers.

(References on following page)

References Cited in the file of this patent

UNITED STATES PATENTS

| | | |
|---|---|---|
| 1,246,087 | Gooch | Nov. 13, 1917 |
| 1,374,762 | Poole | Apr. 12, 1921 |
| 1,376,518 | Duckstine | May 3, 1921 |
| 2,132,213 | Locke | Oct. 4, 1938 |
| 2,416,081 | Bakke | Feb. 18, 1947 |
| 2,420,607 | Mendelsohn | May 13, 1947 |
| 2,420,808 | Bliss | May 20, 1947 |
| 2,605,047 | Nyyssonen | July 29, 1952 |

FOREIGN PATENTS

| | | |
|---|---|---|
| 71,600 | Switzerland | Jan. 17, 1916 |
| 113,791 | Great Britain | May 20, 1920 |
| 544,723 | Great Britain | Apr. 24, 1942 |